(12) United States Patent
Li et al.

(10) Patent No.: US 8,907,929 B2
(45) Date of Patent: Dec. 9, 2014

(54) TOUCHLESS SENSING AND GESTURE RECOGNITION USING CONTINUOUS WAVE ULTRASOUND SIGNALS

(75) Inventors: Ren Li, San Diego, CA (US); Te-Won Lee, San Diego, CA (US); Hui-ya L. Nelson, San Diego, CA (US); Samir K Gupta, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 947 days.

(21) Appl. No.: 12/885,151

(22) Filed: Sep. 17, 2010

(65) Prior Publication Data
US 2012/0001875 A1 Jan. 5, 2012

Related U.S. Application Data

(60) Provisional application No. 61/359,728, filed on Jun. 29, 2010.

(51) Int. Cl.
| | | |
|---|---|---|
| *G06F 3/043* | (2006.01) | |
| *G09G 3/10* | (2006.01) | |
| *G01S 7/527* | (2006.01) | |
| *G06F 3/01* | (2006.01) | |
| *G01S 15/87* | (2006.01) | |
| *G01S 15/50* | (2006.01) | |
| *G01S 15/32* | (2006.01) | |

(52) U.S. Cl.
CPC .............. *G06F 3/011* (2013.01); *G01S 15/325* (2013.01); *G01S 7/5273* (2013.01); *G06F 3/017* (2013.01); *G01S 15/876* (2013.01); *G01S 15/50* (2013.01)
USPC ............................................. 345/177; 345/42

(58) Field of Classification Search
USPC ............................. 345/177, 173, 419, 156, 42
See application file for complete search history.

(56) References Cited

U.S. PATENT DOCUMENTS

| 6,157,592 A | 12/2000 | Kriz et al. |
| 6,633,280 B1 | 10/2003 | Matsumoto et al. |

(Continued)

FOREIGN PATENT DOCUMENTS

| WO | WO2004102301 | 11/2004 |
| WO | WO2006067436 | 6/2006 |

(Continued)

OTHER PUBLICATIONS

Nonaka, et al., "Ultrasonic Position Measurement and its Applications to Human Interface," IEEE Transactions on Instrumentation and Measurement, Jun. 1995, vol. 44, No. 3, pp. 771-774.

(Continued)

*Primary Examiner* — Michael Faragalla
(74) *Attorney, Agent, or Firm* — Anthony Mauro; Espartaco Diaz Hidalgo

(57) ABSTRACT

The embodiments provide systems and methods for touchless sensing and gesture recognition using continuous wave sound signals. Continuous wave sound, such as ultrasound, emitted by a transmitter may reflect from an object, and be received by one or more sound receivers. Sound signals may be temporally encoded. Received sound signals may be processed to determine a channel impulse response or calculate time of flight. Determined channel impulse responses may be processed to extract recognizable features or angles. Extracted features may be compared to a database of features to identify a user input gesture associated with the matched feature. Angles of channel impulse response curves may be associated with an input gesture. Time of flight values from each receiver may be used to determine coordinates of the reflecting object. Embodiments may be implemented as part of a graphical user interface. Embodiments may be used to determine a location of an emitter.

58 Claims, 23 Drawing Sheets

(56) References Cited

U.S. PATENT DOCUMENTS

| | | |
|---|---|---|
| 2007/0211022 A1 | 9/2007 | Boillot |
| 2008/0084789 A1* | 4/2008 | Altman .................. 367/127 |
| 2011/0035213 A1* | 2/2011 | Malenovsky et al. ......... 704/208 |

FOREIGN PATENT DOCUMENTS

| | | | |
|---|---|---|---|
| WO | 2009112901 A1 | 9/2009 | |
| WO | WO 2009/112901 | * 9/2009 | ............... H04B 1/38 |
| WO | WO2009115799 | 9/2009 | |
| WO | WO2009122193 | 10/2009 | |
| WO | WO2009147398 | 12/2009 | |

OTHER PUBLICATIONS

International Search Report and Written Opinion—PCT/US2011/042452—ISA/EPO—Mar. 23, 2012.

* cited by examiner

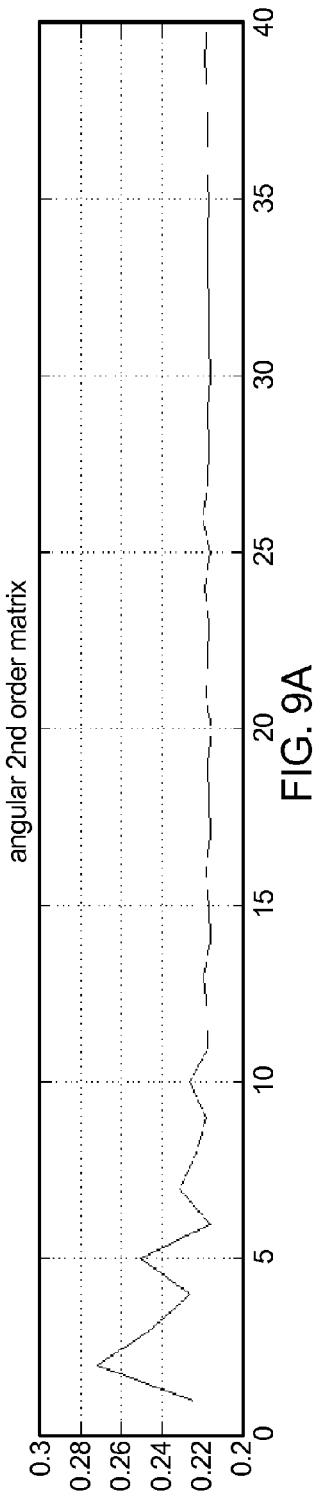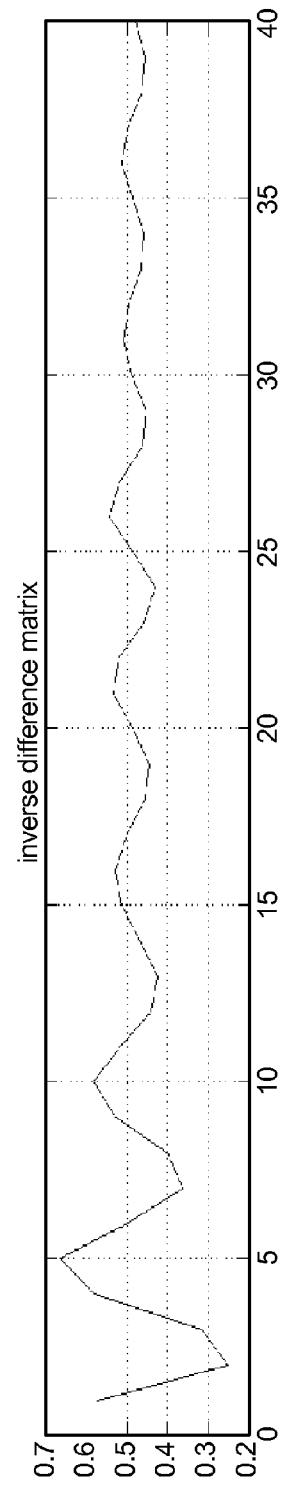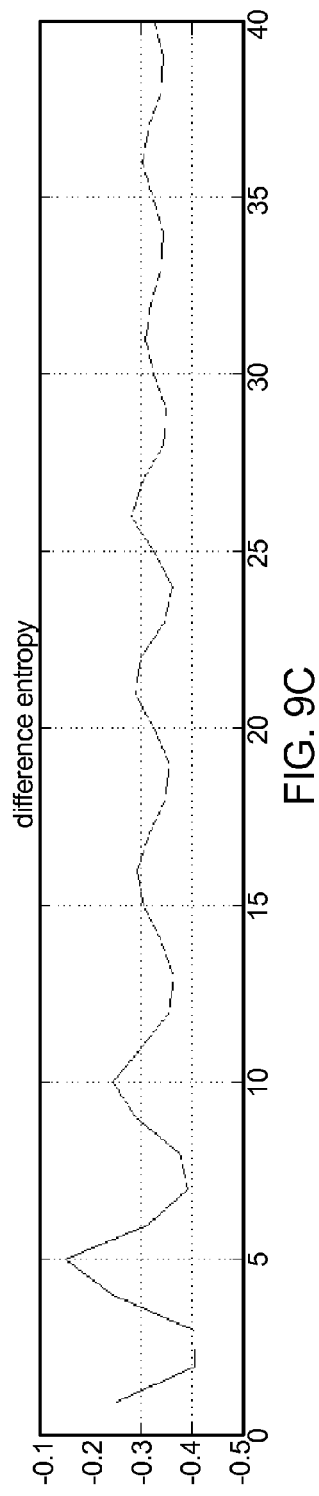

TOUCHLESS SENSING AND GESTURE RECOGNITION USING CONTINUOUS WAVE ULTRASOUND SIGNALS

RELATED APPLICATIONS

This application claims the benefit of priority to U.S. Provisional Patent Application No. 61/359,728 entitled "Touchless Sensing and Gesture Recognition using Continuous Wave Sound Signals" filed Jun. 29, 2010, the entire contents of which are incorporated by reference.

FIELD

The present invention relates generally to user interface systems for computing devices, and more particularly to a touchless user interface employing continuous-wave sound.

BACKGROUND

Ultrasound is a cyclic sound pressure defined as operating at frequencies above the upper limits of human hearing or above approximately 20 kHz. Ultrasound has been implemented a wide range of applications for imaging, source location determination and range measurements. Many of these applications focus on ultrasound's ability to penetrate a medium and provide structural information of objects within the medium via reflections. Most applications make use of ultrasound by measuring the time delay between when ultrasound is emitted and when echoes are detected. In general terms, the two types of ultrasound systems are pulse echo and continuous wave.

SUMMARY

Embodiments provide systems and methods for touchless sensing and gesture recognition suitable for use as a user interface using continuous wave ultrasound signals. Ultrasound signals may be transmitted and reflect off of an object, such as a user's finger or hand. Reflected ultrasound signals may be received by ultrasound microphones. A channel impulse response may be calculated based upon the received ultrasound signals. The channel impulse response may be subjected to different filters and recognizable features may be extracted or recognized. These recognizable features may be compared to stored patterns of features that are correlated to predefined user gestures to determine if the extracted features match any known patterns. If the extracted features match a known pattern, a command (e.g., a user input command) associated with the matching pattern may be implemented by the computing device. In a further embodiment, recognizable features in the channel response may be correlated to particular reflected signals. The reflected signal's time of flight may be calculated and used to derive the coordinates of the reflecting object with respect to the computing device, such as by using an elliptic intersect calculation. This method may also track the motion of the reflecting object as a series of positions, and motion tracking data may be correlated to gestures to provide recognition.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

FIGS. 9A-9C with are graphs showing results of statistical correlation analysis of the simulation results for a user finger moving away from a microphone using three different correlation algorithms.

DETAILED DESCRIPTION

Figure 1:
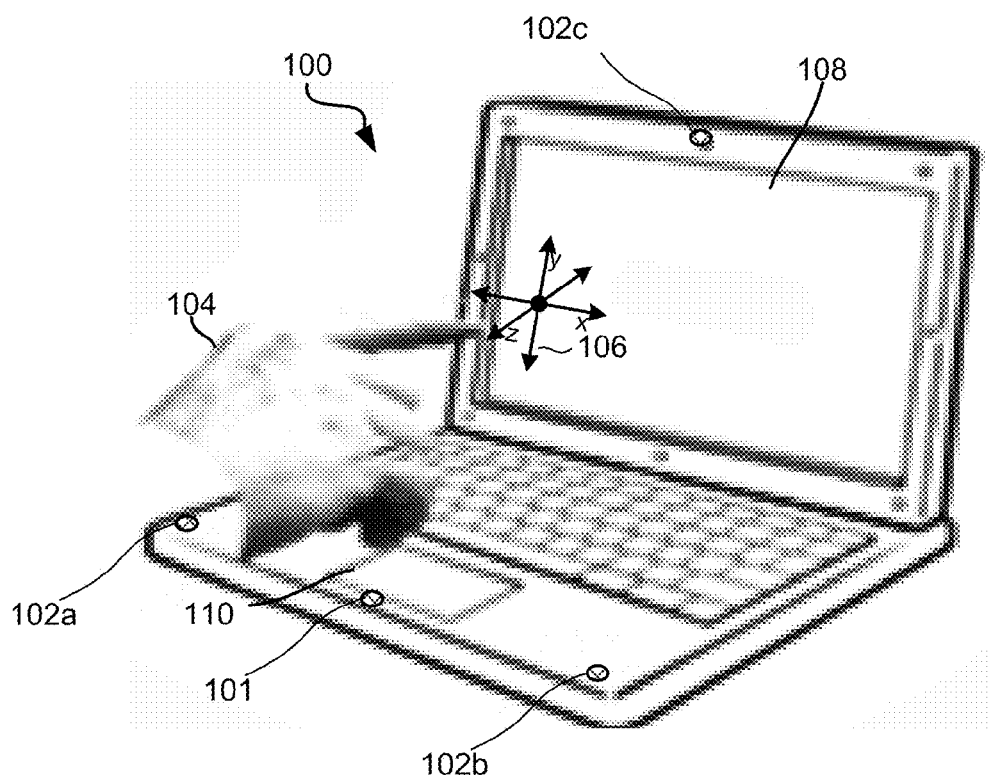
FIG. 1 is an illustration of an embodiment system configured to use ultrasound sensors for gesture recognition.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

As used herein, the term "computing device" refers to any form of programmable computer device with a user interface, including but not limited to laptop and desktop computers, televisions, home appliances, cellular telephones, personal television devices, personal data assistants (PDA's), palmtop computers, wireless electronic mail receivers (e.g., the Blackberry® and Treo® devices), multimedia Internet enabled cellular telephones (e.g., the Blackberry Storm®), Global Positioning System (GPS) receivers, wireless gaming controllers, receivers within vehicles (e.g., automobiles), interactive game devices, notebooks, smartbooks, netbooks, mobile television devices, or any data processing apparatus.

The various embodiments provide systems and methods for touchless user interface sensing and gesture recognition by computing devices using continuous wave ultrasound signals that are emitted from the device and received by one or more detectors or microphones. Continuous wave ultrasound may be emitted by a transmitter or speaker, reflected from an object (e.g., a user's hand), and received by one or more receivers or microphones. For example, an ultrasound emitter or speaker may transmit appropriately encoded continuous wave ultrasound. The ultrasound may propagate through the air and reflect off of a user's hand if the hand is positioned within a reflection detection zone. The reflected ultrasound may be received by one, two, three, or more ultrasound detectors or microphones positioned about the computing device. In the various embodiments, a "channel" may include the sound path from the ultrasound emitter through the air to the user's hand, the reflections from the user's hand through the air to each detector, and the response of each detector. Characteristics of such a channel may be expressed in a channel impulse response which can be determined using known signal processing methods and circuits (e.g., a digital signal processor). Thus, as a user moves a hand or object within a reflection detection zone of the computing device, the characteristics of the channel and the channel impulse response will change due to the different transmission paths of reflected ultrasound. This may include changes in the pattern of reflected echoes due to changes in the angles of incidence of the hand surfaces with respect to the emitted ultrasound. Such changes in the channel impulse response over time can be analyzed to reveal patterns that can be compared to known patterns stored in memory in order to recognize intended user input gestures. Also, any large reflections or portions of a user's hand generating recognized channel impulse response patterns may be processed to measure the time of flight of the ultrasound, from which the computing device can determine the location of the reflecting surface within the 3-D space surrounding the computing device using well known elliptical triangulation calculations. Accurate methods for determining distances to reflecting surface may use well known processing algorithms, such as Kalman filtering, in order to account for noise in the system.

In addition to providing three-dimensional user input gesture recognition capability, touchless gesture sensing capabilities of the various embodiments provide other advantages. The system can detect and interpret user gestures within a large volume surrounding the computing device, such as within 30-40 centimeters around the computing device. Additionally, since the user interface space is above the computing device, the user interface can be configured to be resistant to external conditions, e.g., moisture, dirt, etc. Thus, the various embodiments may have applications in circumstances, systems and locations in which a conventional computer is unsuitable.

In overview, continuous wave ultrasound signal may be modulated in a manner that enables received reflected signals to be correlated with the emitted signal. Matching signals may allow the system to determine the channel impulse response or calculate the difference in time between transmission and reception, or time of flight. System channel input response snapshots or images may be buffered over time to enable changes in the response to be recognized and compared to patterns stored from training sessions. Such buffered images of the channel impulse response may be filtered using special filtering to extract features that can be matched to pre-trained template library of user input gestures. In addition to processing impulse response, particular echo features, such as may be associated with a strongest echo or a first arriving echo, may be processed in order to obtain an accurate estimation of the location of the echo source in 3-D space using time of flight analysis. Mathematical processing, such as Kalman filtering, may be used in order to accurately determine the time of flight or distance in the presence of noise, which is likely to be the case in most use situations. In order to analyze and match the received reflections, embodiments may comprise various signal processing elements. These signal processing elements may filter out patterns and features from the received channel response and correlate these features to a gesture without ever resolving the reflecting object in the channel.

By comparing detected patterns in the channel impulse response to patterns stored in memory, such as from user training sessions, the computing device can identify a most closely matching pattern. By correlating particular user input commands to particular trained gesture patterns, the computing device can be configured to recognize particular user hand movements as user input commands. Thus, in some embodiments, the ultrasound detection system may be implemented as part of a graphical user interface portion of the operating system. In such embodiments, when a channel impulse response pattern is matched to a pattern in memory, an associated user command may be identified and implemented by the computing device. In this manner, a user may control a computing device by pointing or moving a hand above or within the vicinity of a computing device similar to how user commands can be input using known pointing devices or touchscreen displays.

While the various embodiments are described as sending and receiving ultrasound, the embodiments may also be implemented with sound with frequencies below the typical ultrasound region. Provided that the emitted frequencies are above the audible range, the various embodiments may be implemented with high-frequency sound in the manner described herein. Ultrasound is advantageous due to its small wavelength which enables resolution of fine structures of a user's hand. However, due to the low density of air, lower frequency sound may be easier and more efficient to generate using conventional speakers and easier to receive in conventional microphones. Therefore, references to ultrasound herein are not intended to limit the scope of the claims to sound within particular frequency ranges except as specifically recited.

FIG. 1 shows an illustrative implementation of the various embodiments on a laptop computer 100. In the illustrated embodiment, a user interface system within the laptop computer 100 includes an ultrasound emitter 101 and a plurality of ultrasound detectors 102a, 102b, 102c positioned on various parts of the computer 100. In use, a user may position a hand 104 within the 3-D space 106 above or within the vicinity of the computer 100. Rather than using a conventional pointing device, such as a touchpad 110, the user may move a hand 104 within a zone where ultrasound reflections may be detected by the ultrasound detectors 102a, 102b, 102c (which is referred to herein as a reflection detection zone) to perform user input gestures that the computing device can recognize and implement. Graphical representation of the gestures may be presented on the display 108 similar to other graphical user interface systems. Thus, by moving a hand 104 within the X, Y and Z axes of a coordinate system 106 above or around the computer 100, the user can interface with the computer 100 without touching any surfaces. Embodiments enable a touchless user interface system in which user input gestures may be performed in 3-D space, enabling full 3-D user interface capabilities, unlike conventional graphical user interface devices (e.g., computer mouse, touchpad or touch screen) which are strictly two-dimensional.

Figure 2:
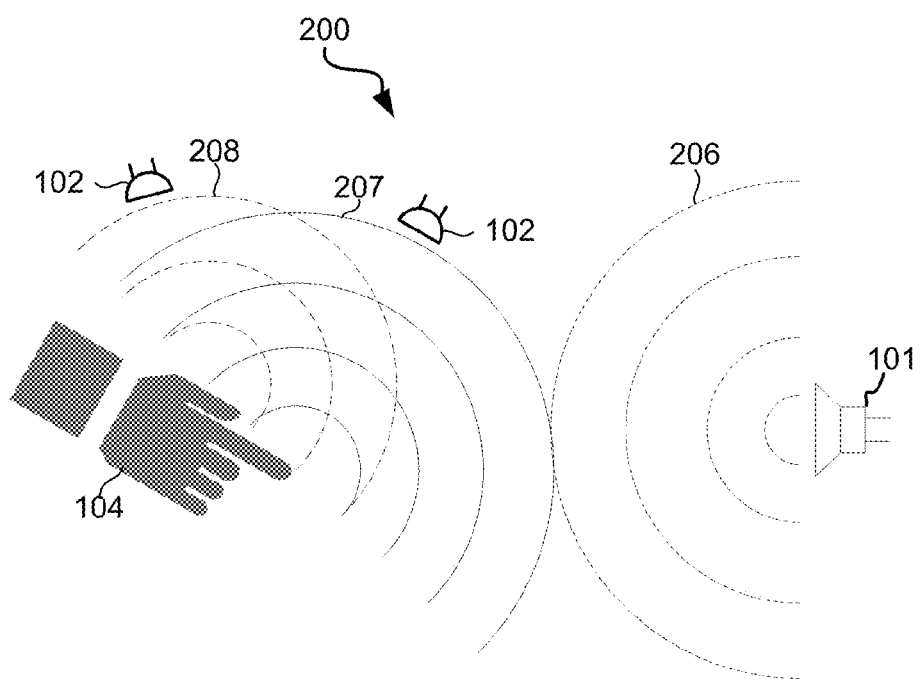
FIG. 2 is a concept diagram of illustrating ultrasound wave fronts propagating from an emitter or speaker, reflecting off a hand of a user and being received by the detectors.

FIG. 2 shows a simple representation of how ultrasound can be used to detect the position and orientation of a user's hand 104. An ultrasound emitter 101 may emit continuous wave ultrasound 206 which propagates through the air. By encoding information in the emitted ultrasound, positional information regarding the user's hand 104 can be determined with continuous wave sound. For simplicity of representation, recognizable features within the continuous wave ultrasound are illustrated with concentric arcs. The emitted ultrasound 206 will reflect off a user's hand 104 when it is within the reflection detection zone resulting in reflected ultrasound 207, 208. Since the user's hand is three-dimensional, a plurality of reflected ultrasound wave fronts 207, 208 will result from reflections from various features on the user's hand. Since the features are located at different distances from the ultrasound emitter 101, the wave front reflected off of each feature in any given instant will differ. Further, the distance from various features on the user's hand to each ultrasound detector 102 will also differ. Consequently, sound reflected from a user's hand 104 will arrive at a detector 102 in a plurality of wave fronts each slightly offset from one another in time. The reflected ultrasound arriving at a detector 102 thus encodes information regarding the location, shape and orientation of a user's hand. In a conventional imaging ultrasound system, the echo arrival time measured by detectors 102 may be used to generate an image of the reflecting surface.

Modern ultrasound imaging systems use phased array systems in order to develop accurate images. However, such image generation is processor intensive, and thus not suitable for basic user interface systems. The various embodiments bypass the imaging process, and instead make use of the location, shape and orientation information that is encoded in received ultrasound by processing changes in the channel impulse response of the communication channel spanning the emitter 101, the reflecting surface 104, and the detector 102, as well as the intervening space.

Figure 3:
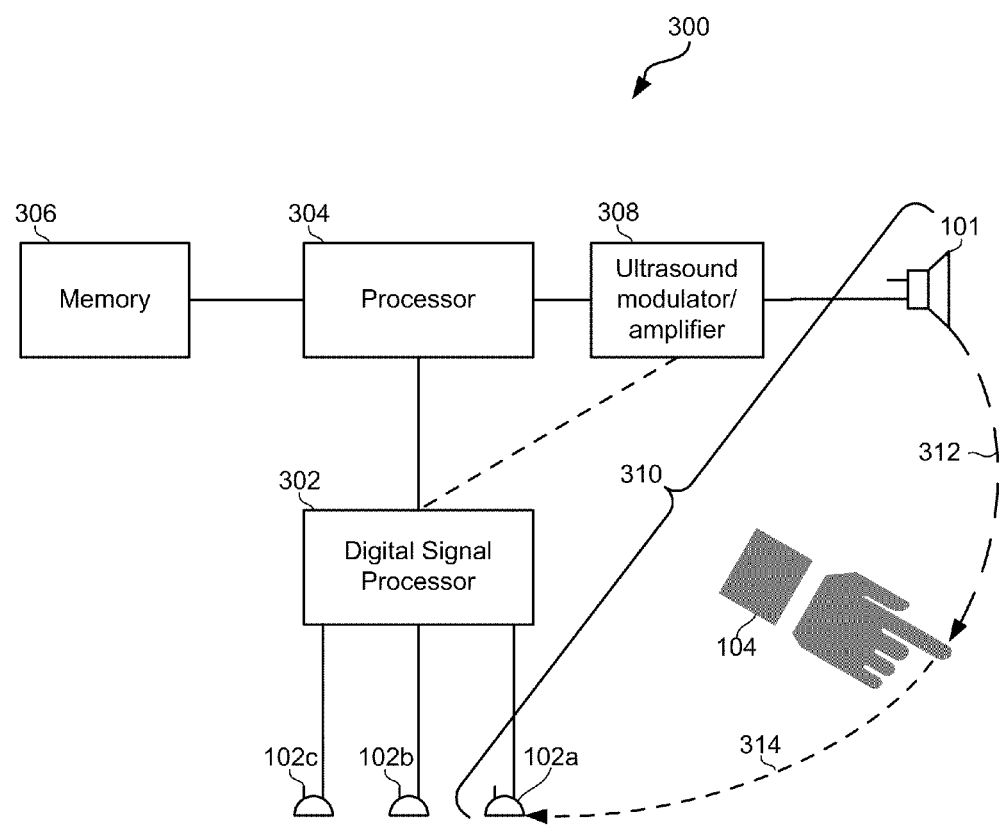
FIG. 3 is a functional and component block diagram of an embodiment system for recognizing gestures with continuous wave ultrasound.

FIG. 3 illustrates a computing system 300 implementing various embodiments. An embodiment computing system 300 may include an ultrasound emitter 101 and one or more ultrasound detectors or microphones 102a, 102b, 102c that are coupled to a digital signal processor 302 that is coupled to the central processor 304 of the computing device. The central processor 304 may be coupled to a memory 306 and to an ultrasound modulator/amplifier circuit 308 which is coupled to the ultrasound emitter 101. The ultrasound modulator/amplifier circuit 308 may be configured to receive from the processor 304 information to be encoded into continuous wave ultrasound, such as a pseudorandom number or pseudorandom noise. It may use this information to generate the electrical signal applied to the ultrasound emitter 101 to emit the modulated ultrasound. In some implementations, the ultrasound modulator/amplifier circuit 308 may be coupled to the digital signal processor 302 and configured to receive the signals of information to be modulated into ultrasound from the digital signal processor 302 instead of from the central processor 304.

In some embodiments, the ultrasound emitter 101 may be a separate sound emitting component, such as an ultrasound transducer mounted on the surface of the computing device. In other embodiments, the ultrasound emitter 101 may be the computing device's speaker or an element within the speaker, such as a piezo speaker or tweeter element. Similarly, in some embodiments, the ultrasound detectors or microphones 102a, 102b, 102c may be separate components, such as dedicated ultrasound transducers. In other embodiments, ultrasound may be sensed by the computing device's microphone or an element within the microphone, such as a high-frequency sensing component. In a further embodiment, one or more ultrasound transducers may function either as an ultrasound emitter or as an ultrasound detector.

As described above, the various embodiments make use of a communication channel 310 that is defined to encompass the ultrasound emitter 101, the propagation path 312 through the air from ultrasound emitter 101 to the user's hand 104, reflections from the user's finger or hand 104, the propagation path 314 through the air from the user's hand 104 to an ultrasound detector 102a, and the ultrasound detector 102a, 102b, 102c. A separate communication channel will thus exist between the ultrasound emitter 101 and each of ultrasound detector 102a, 102b, 102c included in the computing system 300. Although the various embodiments may be implemented with a single ultrasound detector 102a, two or more ultrasound detectors may be positioned in various locations on the computing system 300 in order to obtain more information regarding the location, shape, and orientation of the user's hand 104 or to better distinguish user input gestures.

Figure 20:
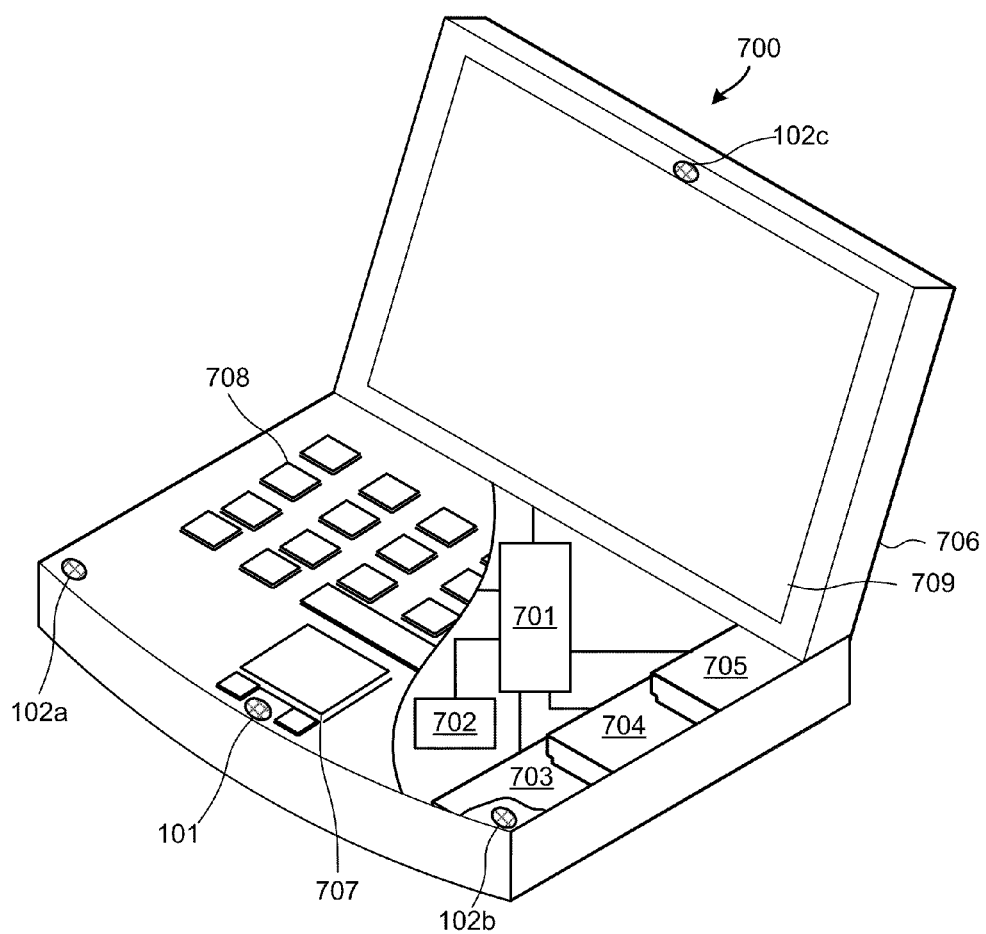
FIG. 20 is a component block diagram of an example computer suitable for use with the various aspects.

Like any communication channel, changes in any one of the elements of the through the air ultrasound mitigation channel 310 may result in changes in the channel impulse response. In most operating conditions, properties of the ultrasound emitter 101 and detector 102a, as well as the sound propagation characteristics of the surrounding air, may be presumed to be constant within the timeframe of a typical user interface gesture, which will span just a few seconds. Thus, changes in these elements of the communication channel 312 due to changes in temperature, humidity, etc. may be ignored. Therefore, analysis of the communication channel 310 can be accomplished presuming that all changes in the impulse response are due to changes in the location, shape, and orientation of a reflecting surface, such as a user's hand 104. For example, movement of the user's hand 104 towards the ultrasound emitter 101 will reduce the emitter-to-hand propagation path 312 and, most likely, change (lengthen or shorten) the hand-to-detector propagation path 314. Also, movement of the user's hand 104, such as rotating, extending or retracting fingers, etc. will change the orientation of reflecting surfaces vis-à-vis the impinging ultrasound, and thus change the pattern of the reflected ultrasound that is received by the detector 102a. Additionally, rapid movement of the user's hand 104 towards or away from the ultrasound emitter 101 may also cause a Doppler shift in the reflected ultrasound that is received by the ultrasound detector 102a. Such changes in the communication channel 310 resulting from the user's hand 104 movements within the reflection detection zone will be reflected in the channel's impulse response. Thus, by analyzing changes in the communication channel 310 impulse response over time, the computing system 300 can obtain information regarding the position, shape and orientation of the user's hand 104. By placing three or more ultrasound detectors 102a, 102b, 102c in various locations on the computing system 300, such as spaced apart in three dimensions such as illustrated in FIG. 20 described below, the computing system 300 can obtain three-dimensional position information regarding the user's hand 104.

Calculations involved in the sampling of ultrasound signals received by the ultrasound detectors 102a, 102b, 102c, and the determination of the channel impulse response for each communication channel 310 may be performed by the digital signal processor 302 or another suitably configured processing circuit. Processing of the channel impulse response data, such as the filtering, grayscale processing, and statistical analysis of the various embodiments described below may be performed in the digital signal processor 302, or partially in the digital signal processor 302 and partially in the central processor 304. Recognizable features extracted from the channel impulse response by the processing performed in the digital signal processor 302 and/or central processor 304 may be compared to patterns stored in the memory 306 using pattern comparison algorithms performed by the central processor 304 or another processor within the computing system 300. If the central processor 304 determines that patterns extracted from the channel impulse responses of one or more of the communication channels 310 match a pattern stored in the memory 306, the central processor 304 may determine the user input commands associated with the matched pattern and implement the command like any other user input command.

Figure 4:
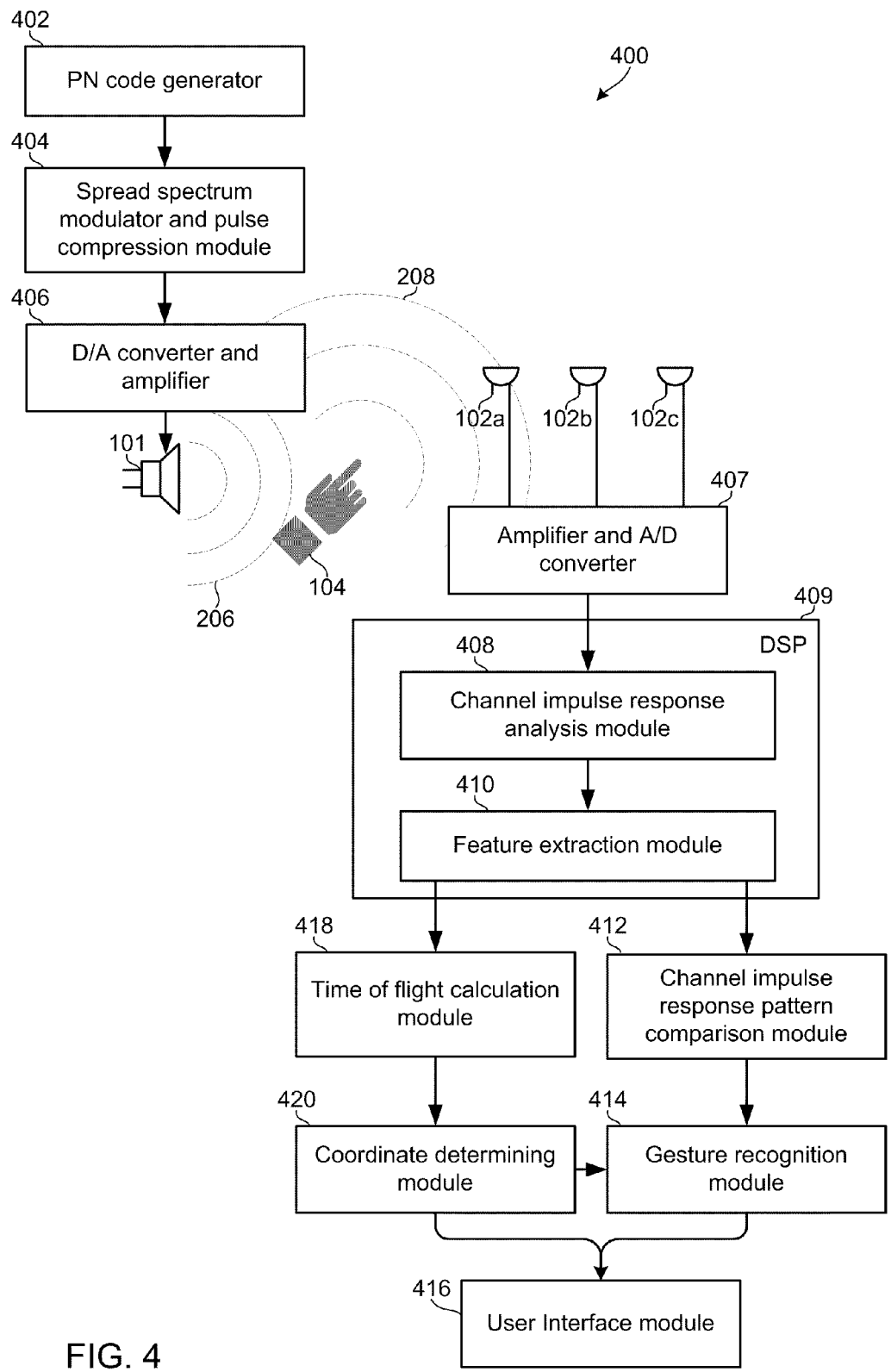
FIG. 4 is a functional system block diagram of the various processing and hardware modules of an embodiment system.

FIG. 4 illustrates functional modules and hardware elements of an embodiment system 400. To generate the emitted continuous wave ultrasound, a pseudorandom noise or pseudorandom number generator module 402 may generate a pseudorandom code. This code may be provided to a spread spectrum modulator and pulse compression module 404 which includes the pseudorandom noise in digital information that is provided to a digital to analog converter and amplifier module 406. This module 406 may provide an analog signal to the ultrasound emitter 101. As described above, emitted ultrasound 206 reflects off of a user's hand 104 generating reflected ultrasound 208 which is received by one or more ultrasound detectors or microphones 102a, 102b, 102c. Signals from the one or more ultrasound detectors or microphones 102a, 102b, 102c may be processed by an amplifier and analog to digital converter module 407 with the resulting digital data passed to a digital signal processor 409. In some implementations, the analog to digital conversion process module 407 may be included within the digital signal processor 409. The digital signal processor 409 may be configured with DSP-executable software modules including a channel impulse response analysis module 408 and a feature extraction module 410. Processing accomplished in the channel impulse response analysis module 408 and a feature extraction module 410 is described in more detail below.

Results from the feature extraction module 410 may be processed by a channel impulse response pattern comparison module 412 that compares extracted features to patterns stored in memory 306. The channel impulse response pattern comparison module 412 may calculate correlation values reflecting the degree to which a channel impulse response pattern matches or is similar to a pattern stored in memory. These results may be processed by a gesture recognition module 414 which functions to select a best matching pattern and identify its associated user input command. The gesture recognition module 414 may take into consideration the context of the user input gesture or current operating state to select among matched patterns those which are most relevant to the current operating condition. In doing so, the gesture recognition module 414 may select a pattern with a relatively high correlation factor if its associated user input command is relevant to the current operating state. For example, if multiple patterns have relatively high correlation factors, but some of the patterns have associated user input commands that cannot be executed in the current operating state (e.g., commands related to applications that are not currently executing), the gesture recognition module 414 may discard those patterns. Also, the gesture recognition module 414 may take into consideration previous input gestures (e.g., a selection command) in selecting among the patterns with relatively high correlation factors, to select among patterns associated with commands relevant to the previous user input command. For example, if the previous input gesture was a selection command, the gesture recognition module 414 may select among patterns associated with a command relevant to a selected object, such as pattern associated with a move, copy, or cut command.

A single command associated with a best matching pattern under the circumstances and consistent with the current operating state identified by the gesture recognition module 414 may be passed to a user interface module 416 for execution like any other user interface command. The user interface module 416 may pass the identified command to the processor for execution. The user interface module 416 may also generate a display which is provided to the computing device display that is consistent with the identified command. For example, if the gesture recognition module 414 determines that the user has executed a select command (e.g., by pointing to an object in 3-D space, pinching two fingers together, or forming a first) the user interface module 416 may generate a graphical user interface display that shows that the object has been selected, such as in a manner similar to how selected objects are shown in graphical user interfaces featuring a computer mouse, touchpad or touchscreen user interface device. As another example, if the gesture recognition module 414 determines that the user has executed a move command (e.g., by moving a hand from one position to another following execution of a select command), the user interface module 416 may generate a display showing the selected object moving within the displayed image.

In a further embodiment, user input gestures may be determined by or implemented based upon the three-dimensional location of the user's finger or hand. In such embodiments, it is necessary for the computing device to determine an absolute or relative location of the user's finger or hand within the reflection detection zone. This may be accomplished by a time of flight calculation module 418 and a coordinate determining module 420. The location of a reflector within the reflection detection zone may be determined based upon the time of arrival of reflected ultrasound at the ultrasound detectors. This time of flight will depend upon the distance from the emitter to the user's hand and from the hand to each ultrasound detector. The time of flight can be determined based upon the encoded signal since the computing device knows the time or relative time when each encoded signal is broadcast and can detect the arrival of the reflection based upon the information included within the signal. The determined time of flight data from each ultrasound detector can then be processed by the coordinate determining module 422 to estimate the location of the reflector using elliptical triangulation methods. Since the received reflected ultrasound is likely to be a noisy channel, Kalman filtering of the data may be used to determine a most likely time of arrival which then can be used in the elliptical triangulation calculations. Embodiment methods for determining the coordinates of a reflector are described more fully below.

The coordinates of the user's hand determined by the coordinate determining module 420 may be used as inputs to the user interface module 416. For example, the coordinates of the tip of a user's finger determined by the coordinate determining module 420 may be used by the user interface module 416 to position a cursor or pointer on a graphical user interface display. In this manner, a user may move a finger about within the reflection detection zone in order to manipulate a cursor or pointer on the display screen in a manner similar to how users manipulate cursors and pointers using a computer mouse, touch pad or touchscreen user input device. As a further example, the coordinates of a user's hand determined by the coordinate determining module 420 may be used by the user interface module 416 to position a selected object shown in a graphical user interface display.

Some user interface gestures may be recognized by the gesture recognition module 414 based both upon matched patterns in channel impulse response features and upon the coordinates of the user's hand or finger. Thus, reflection coordinates may also be provided by the coordinate determining module 420 to the gesture recognition module 414. The gesture recognition module 414 may then determine a user input gesture based upon pattern match correlation values, context or operating state and location of the user's hand or finger within the reflection detection zone. For example, a given movement of a user's hand may have different meanings (i.e., correlated to different user input commands) depending upon whether the motion is performed close to or far away from the computing device display or keyboard. Thus, a user waving a hand back and forth at a distance from the display may be associated with a command to wake up the computer or deactivate a screen saver on the display, while a user waving a hand back and forth close to the display may be associated with a command to erase or delete a selected object or portion of the display.

FIG. 4 is provided as an example of one possible organization of the various embodiment processes and operations, but is not intended to limit the scope of the claims to the illustrated configuration. The processing and operations of the various embodiments may be configured in hardware, software, or combinations of hardware and software that may be organized or interact in a manner different from that shown in FIG. 4.

One method that may be used to encode temporal information into continuous wave emitted sound is to generate pseudorandom noise and utilize a spectrum modulation scheme. In this manner, at each instant the embedded ultrasound is different from all other instances (depending upon the degree of randomness of the noise) which enables reflected sound arriving from different points of reflection to encode information regarding the position, orientation and shape of a reflected surface over distances longer than the wavelength of the sound. The use of pseudorandom noise instead of non-random or systematic encoding (e.g., a continuous sweep through a range of ultrasound frequencies) may render the system less vulnerable to noise and deterministic interference since any condition or interference which results in a degraded channel response in one instance is unlikely to be encountered again until the same random noise and frequency combination is emitted, which will be extremely infrequent when a suitably randomizing method is used. Methods for generating pseudorandom noise are well known in the communication arts, and include generating a long pseudorandom number that is encoded into the signal. A pseudorandom number is a binary sequence that appears random over a very large number of bits. Modulation of the pseudorandom noise into the continuous wave ultrasound may result in an ultrasound signal that spans a broad range of frequencies. This may be accomplished by encoding a pseudorandom number using a spread spectrum modulation method, such as orthogonal frequency division multiplex (OFDM) modulation and pulse compression.

With temporal information included within the continuous wave ultrasound, information related to the location and surface features of the reflector (e.g., a user's hand) can be extracted from the received reflected ultrasound. However, as noted above, imaging of the reflector would require a lot of processing power but is not necessary to accomplish user input gesture recognition. Instead, the various embodiments analyze information encoded in the reflected ultrasound by determining the channel impulse response and comparing changes in the data over time to patterns of such data stored in memory.

A channel impulse response refers to the reaction of communication channel in response to some external change. In the various embodiments the external change is movement of the reflector (i.e., a user's hand or finger) within the reflection detection zone. The channel impulse response describes the reaction of the channel as a function of time as the user's hand or finger moves within the reflection detection zone. The channel impulse response of a particular emitter-hand-detector ultrasound transmission path channel may be analyzed in a number of well-known manners. For example the output of a channel y(t) may be modeled as the sum of the products of the impulse x(t) applied to the channel (i.e., the emitted ultrasound signal in this instance) and the impulse response h(t) of the channel. In other words, y(t)=x(t)*h(t). The channel output may be estimated using equation 1 below.

$$y(n)=x(n)*h(0)+x(n-1)*h(1)+\ldots x(n-M-1)*h(M-1) \quad \text{Eq. 1}$$

To solve this equation using signal tap measurements over a sampling period, Eq. 1 can be transformed into matrix format to enable solution by a computer processor (e.g., a DSP). If the known transmitted signal pattern at time n is defined as x(n), an X matrix may be defined as the matrix of x(n), x(n-1), ... x(n-N-M) which is the known transmitted signal pattern. Matrix Y representing the received signal is defined as Y=[y(n) y(n-1) y(n-N-1)]' where y(n) is given by Eq. 1. Matrix H, which is the channel impulse responses to be calculated then can be defined as H=[h(0), h(1), h(M-1)]'. The channel output may then be defined by Y=X*H, where Y is an N by 1 matrix, H is an M by 1 matrix, and X is an N by M matrix. Therefore, the channel impulse response H may be determined by H=X$^{-1}$*Y. In real systems, H is the convolution result of both acoustic and electronic channels. H=H$_a$*H$_e$. X*H=X*H$_a$*H$_e$=Y+N, where N is noise, H$_a$ is the acoustic path, and H$_e$ is the electrical path. Given an electrical channel, the acoustic path can be obtained as: H$_a$=(X* He)$^{-1}$*Y.

In an embodiment, a band pass filter in the ultrasound band may be used to pre-process the input signals in order to reject the audio band noise. If so, its impulse response will be part of (i.e., included within) the impulse response H.

Since the emitted ultrasound signal pattern X(n) is known, many pseudo matrix inversion methods, such as generalized singular value decomposition, can be used to calculate the inverse of matrix X. Due to the presence of noise in the received microphone signals, proper regularization measures may be needed to derive a stable solution. Using that result, the channel impulse response can be calculated from the signal measured by the ultrasound detectors. The calculated impulse response H may then be smoothed by using a smooth factor to reduce noise. While the foregoing shows how the channel impulse response can be calculated from time domain measurements, channel impulse response can also be calculated in the frequency domain.

The impulse response update rate may be determined by the size of matrix X and length of H which are a matter of memory that is allocated to the processing associated with the ultrasound gesture recognition processes. For example, if N+M=800, the received ultrasound signal may be sampled and the channel impulse response may be updated 240 times per second (i.e., 240 Hz).

As illustrated in FIG. 4, there are two sets of ultrasound signals arriving at the detectors 102, the reflected set of signals 208 which are the desired aspects and the direct transmission of the emitted sound 206. The direct sound transmission may be referred to as crosstalk. The computing device may process the total channel impulse response to delete the portion of the response due to direct transmission in order to reveal the difference that represents the channel impulse response due to the reflected ultrasound. The channel impulse response due to the reflected ultrasound may be determined by subtracting an average background channel impulse response (i.e., the channel impulse response measured when there is no reflector present in the reflection detection zone) from the total channel impulse response calculated based upon the measured ultrasound signals. Since ultrasound is not audible to the human ear, the background channel measurement can be measured at predetermined intervals whenever no reflector is presented within the reflection detection zone. Subtracting the average background channel impulse response from the total channel impulse response yields the "reflector channel impulse response." Thus, H$_r$=H$_t$-H$_{bg}$ (hereinafter "Eq. 2") where H$_r$ is the reflector channel impulse response, H$_t$ is the total channel impulse response and H$_{bg}$ is the background channel impulse response. Channel impulse responses calculated by matrix inversion may be sensitive to noise at the microphones. The reflector channel response may be more robust to noise.

Changes in the reflector channel impulse response as a function of time may be tracked and used to measure the relative changes of the reflector channel impulse response versus time. A "difference channel impulse response" can be calculated as the difference in the reflector channel impulse response at a first sampling time and the reflector channel impulse response in the next sampling time. In other words: H$_d$(n)=H$_r$(n)-H$_r$(n-1) (hereinafter "Eq. 3") where H$_d$(n) is the difference channel impulse response at time n. The difference channel impulse response may be used to recognize dynamic user input gestures in which the user is moving a hand or finger within the reflection detection zone. To facilitate analysis, the difference channel impulse responses may be buffered in memory as a series of images over time.

Figures 5A, 5B, 5C, 5D:
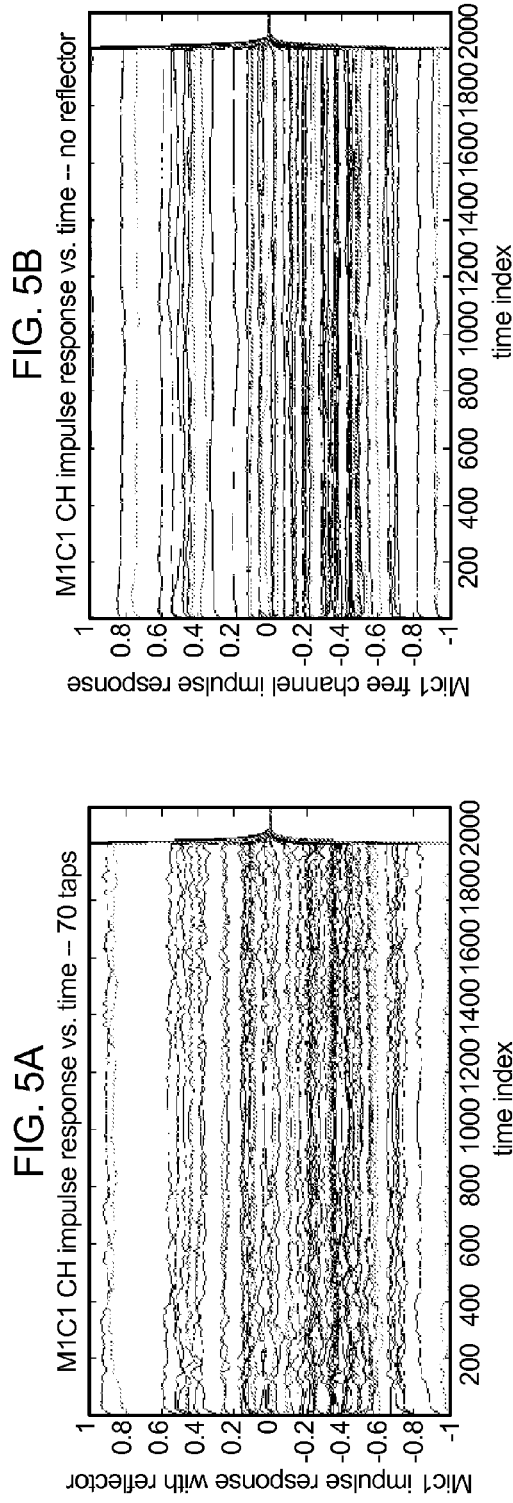
FIG. 5A is a graph of a channel impulse response versus time for a microphone in a prototype system in the presence of a reflector (e.g., a user's hand).
FIG. 5B is a graph of a channel impulse response versus time for a microphone in a prototype system with no reflector present.
FIG. 5C is a graph of the channel impulse response versus time of a reflector alone computed as the difference between the channel impulse response illustrated in FIG. 5A and the channel impulse response illustrated in FIG. 5B in a prototype system.
FIG. 5D is also a graph of the difference impulse response.

FIGS. 5A through 5D illustrate an example of the results of processing difference channel impulse response images obtained in a prototype system. FIG. 5A shows the raw results of the calculate channel impulse response versus time for a single microphone in the presence of a reflector, such as a user's hand. In this prototype, the channel impulse response was measured using 70 signal taps. The features in the total measured channel impulse response shown in FIG. 5A are mixed in with the crosstalk channel impulse response, so the background channel impulse response needs to be subtracted before the features in the reflected channel impulse response can be determined. FIG. 5B illustrates the measured background channel impulse response obtained with the same system when there is no user hand in reflection detection zone. With no reflector present, the channel impulse response is predictably relatively uniform over time. By subtracting the background channel impulse response shown in FIG. 5B from the measured total channel impulse response shown in FIG. 5A, the reflector channel impulse response can be obtained using Eq. 2. Then, by measuring the difference channel impulse response using equation Eq. 3, trends in the reflector channel impulse response may be revealed as shown in FIG. 5C. As FIG. 5C illustrates, the difference channel impulse response contains significant information about movements of the reflector (i.e., the user's hand) within the reflection detection zone. FIG. 5D illustrates another view of the difference impulse response as measured in the prototype.

One of the methods for distinguishing recognizable features in channel impulse response data involves applying a grey level covariance matrix analysis to the data. A grey level covariance matrix may be determined from an edge filtered channel impulse response. A grey level covariance matrix is a well known image processing technique, which may involve a tabulation of how often different combinations of grey levels occur in an image matrix at a given offset. Grey levels may represent a spectrum of values ranging from a simple on and off to any number of variables. For example, grey levels for an image may range from zero to four with zero being white, four being black, and the numbers in between representing shades of gray. To form the grey level covariance matrix, an offset parameter may be set. This offset defines how combinations of elements will be grouped for comparisons. For example, the offset parameter may be defined so that each image matrix element is compared to the neighboring element to the right. Depending on the grey levels of the two elements of each combination, a value is added to one of the elements in the grey level covariance matrix. Each element of the grey level covariance matrix will contain a value representing the number of times that certain grey levels are combined and compared together. The sum of the elements in the grey level covariance matrix equals the number of comparisons, but if grey levels are clustered in the image, certain elements will contain relatively high values. Conversely if the image's grey levels are well mixed and the image is relatively homogenous, the values in the elements will be evenly dispersed.

Grey level covariance matrices are often applied to images, but they may be used to search for patterns in dispersion of values, or grey levels, within any matrix. The buffered difference channel impulse response images may each be used to populate a grey level covariance matrix. Statistical features may be derived from each of these grey level covariance matrices. By applying grey scale processing on the difference channel impulse response, further detail in the patterns contained within the signal can be obtained.

In order to reveal or extract features within the difference channel impulse responses, the difference channel impulse response images may be processed using edge filters. Edge filtering may help to reveal or extract aspects of interest within the images and reduce the overall processing required to obtain useful information from the channel impulse response data. A number of edge filtering processes may be used. For example, a southeast and northwest edge filter may be used as shown below:

$$f_{s\_enw} = \begin{bmatrix} 6 & 0 & -6 \\ 0 & 0 & 0 \\ -6 & 0 & 6 \end{bmatrix}$$

By using different types of edge filters, different patterns may be detected in the analyzed channel impulse response based on the changes in the position and movement of the user's hand within the reflection detection zone. Such patterns are illustrated in FIG. 6A through FIG. 7C.

Figure 6A:
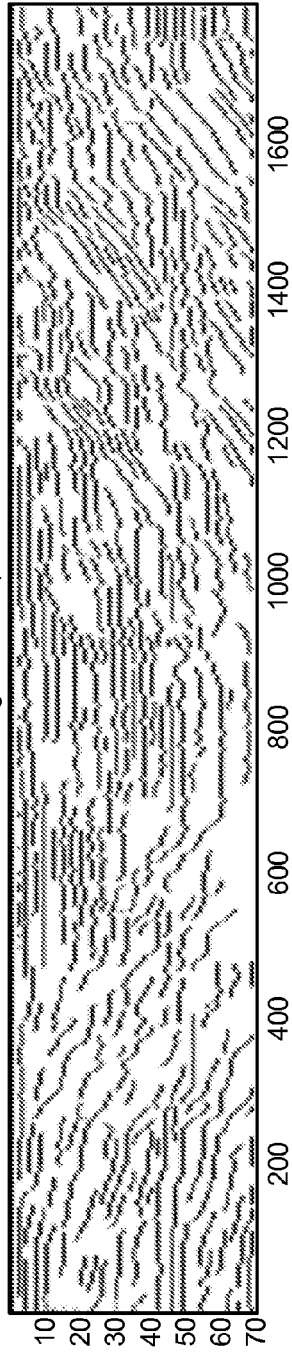
FIGS. 6A-6C are graphs showing results of applying different forms of the edge filtering to differential channel response versus time in which a user's finger moves towards and away from a microphone in a prototype system.
Figure 6B:
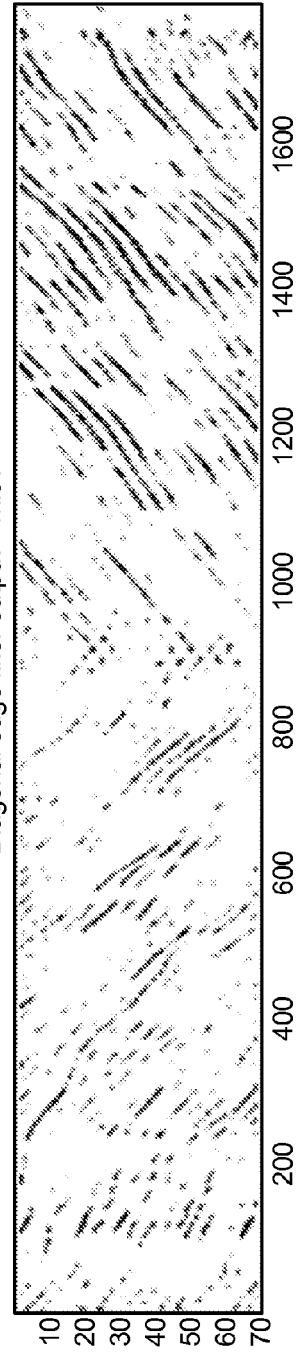
Figure 6C:
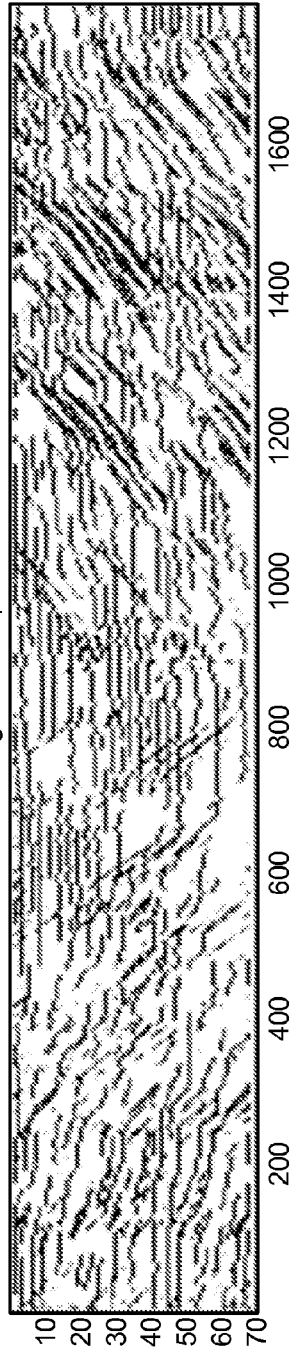

Referring to FIGS. 6A-6C, using a prototype system, difference channel impulse response data was obtained while a user moved a finger away from and towards a microphone in the reflector detection zone. The difference channel impulse response data was then processed with three types of edge filters. The results of applying a horizontal edge filter to the data is shown in FIG. 6A, with the left half of the figure corresponding to when the user's finger was moving away from the microphone and the right half of the figure corresponding to when the user's finger was moving towards the microphone. FIG. 6B shows the results of applying a diagonal edge filter to the same data, and FIG. 6C shows the results of applying a maximum horizontal and diagonal edge filter to the same data.

Figure 7A:
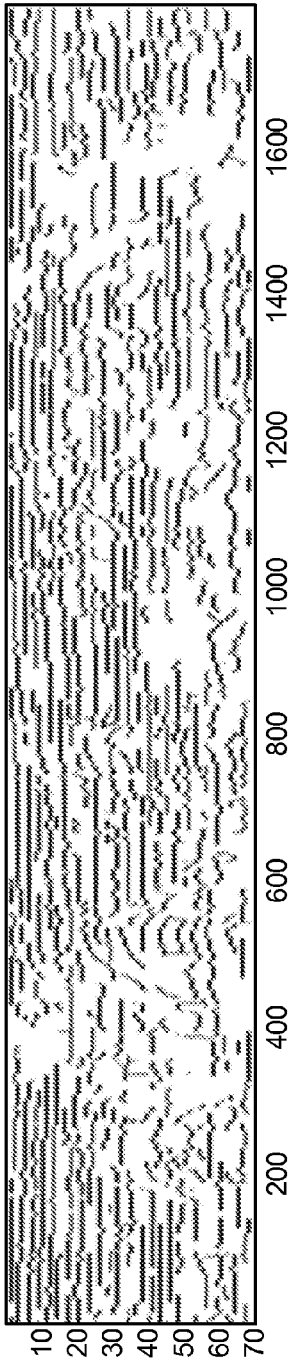
FIGS. 7A-7C are graphs showing results of applying different forms of the edge filtering to differential channel response versus time in which a user's hand moves left to right and right to left two times in front of a microphone in a prototype system.
Figure 7B:
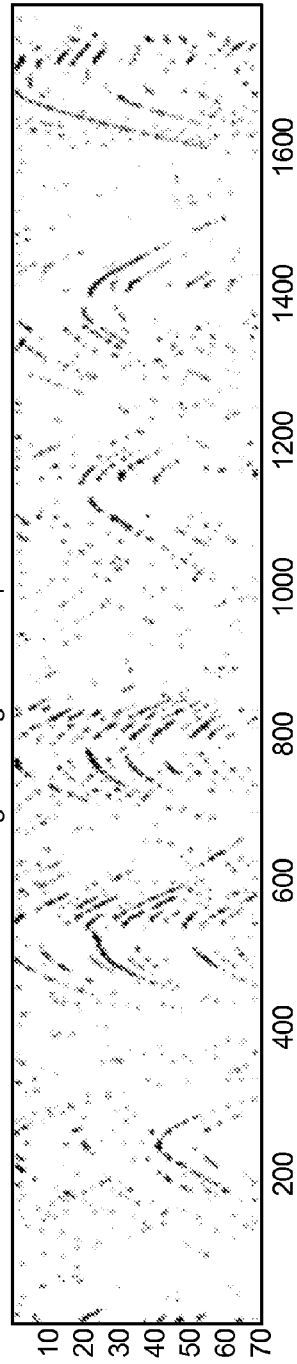
Figure 7C:
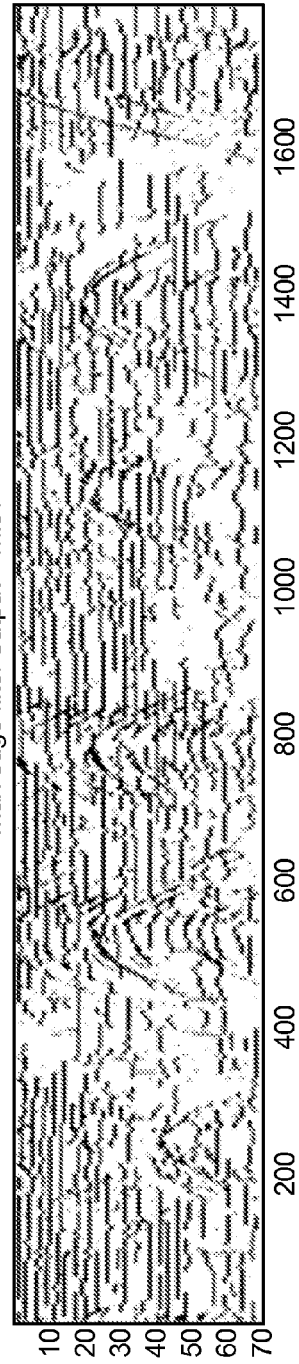

FIG. 7A through 7C show an example of patterns that may be detected using edge filters applied to the difference channel impulse response when a user's hand moves. Using the prototype system, difference channel impulse response data was obtained while a user moved a hand back and forth within the reflection detection zone. The difference channel impulse response data was processed with three types of edge filters. A horizontal edge filter yielded the patterns shown in FIG. 7A, a diagonal edge filter yielded the patterns shown in FIG. 7B, and a maximum horizontal and diagonal edge filter yielded the patterns shown in FIG. 7C.

Although the full nature of the patterns in the process channel impulse response data may be difficult to distinguish with the human eye, some clearly recognizable patterns can be appreciated from the figures. Such patterns may be processed or recognized in a manner similar to how two-dimensional bar codes are read by barcode readers systems. By processing the results of the edge filtered difference channel impulse responses over time, a computing device may compare measured patterns to patterns stored in memory in order to identify a closest matching pattern using well known pattern recognition algorithms. The closest matching pattern may then be correlated to a user input gesture stored in the memory of the computing device.

While a variety of different filters may be applied, an embodiment may only apply one type of filter in a given analysis. For example, a horizontal edge filter may be sensitive to a user's hand remaining stationary within the reflection detection zone, such as a finger hovering in place, and may be a preferred edge filter to use to extract recognizable patterns resulting from such positions. In contrast, a diagonal edge filter may be more sensitive to relative movement between the user's hand and the sensors within the reflection detection zone. Thus, the computing device may try different edge filters to select the type of edge filter that provides the best extraction of features for the particular user gesture, and then continue to use the selected edge filter for processing the difference channel impulse response images in order to extract features to be compared to patterns stored in memory.

Extracted features may be used to cluster or classify the difference channel impulse response images. Statistical processing of the difference channel impulse response image may be used to accomplish this. One method that may be implemented is a grey level covariance matrix analysis. Frequency and spatial domain features may be extracted from a grey level covariance matrix calculated from the edge filtered responses. Spatial features may include a correlation function, second order function, inverse difference matrix function, or a difference entropy function. An example of such an analysis is provided below.

If g is defined as the grey level, i may be defined as the series i=1, 2 ... g, and j may be defined as j=1, 2 ... g. Further, $p_x$ may be defined as $$p_x = \sum_{j=1}^{g} p(i, j), i = 1, 2, \ldots g \text{ and } p_y \text{ may be defined as}$$

$$p_y = \sum_{i=1}^{g} p(i, j), j = 1, 2, \ldots g$$

If $\mu_x$=mean($p_x$) and $\mu_y$=mean($p_y$), and if $\sigma_x$=var($p_x$) and $\sigma_y$=var($p_y$), and g is the grey level, the correlation function may be defined as $$f = \left\{ \sum_{i=1}^{g} \sum_{j=1}^{g} i * j * p(i, j) - u_x - u_y \right\} / \sigma_x \sigma_y \qquad \text{Eq. 4}$$

The second order function may be defined as $$f_1 = \sum_{i=1}^{g} \sum_{j=1}^{g} \{p(i, j)\}^2 \qquad \text{Eq. 5}$$

The inverse difference matrix function may be defined as $$f_5 = \sum_{i=1}^{g} \sum_{j=1}^{g} \frac{1}{1 + (1-j)^2} p(i, j) \qquad \text{Eq. 6}$$

$P_{x-y}(k)$ and k may be defined as $$P_{x-y}(k) = \sum_{i=1}^{g} \sum_{j=1}^{g} p(i,j), k = 0, 1, \ldots g-1, |i-j| = k \qquad \text{Eq. 7}$$

The difference entropy function may be defined as $$f_{11} = -\sum_{i=0}^{g-1} p_{x-y}(i) \log[p_{x-y}(i)] \qquad \text{Eq. 8}$$

Figure 8A:
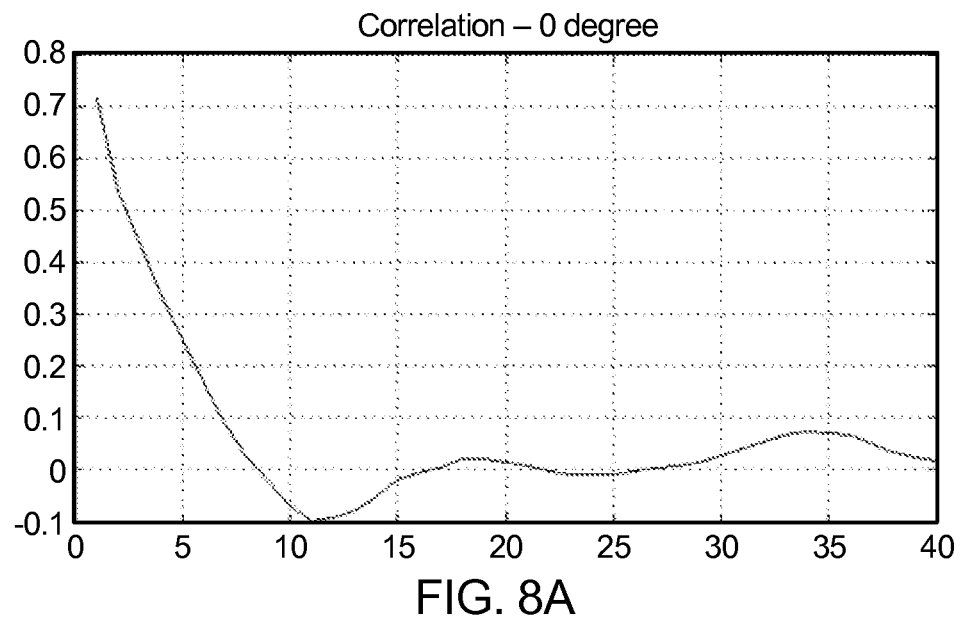
FIGS. 8A-8D are graphs showing results of statistical correlation analysis of the simulation results for a user finger moving away from a microphone using four different correlation functions.
Figure 8B:
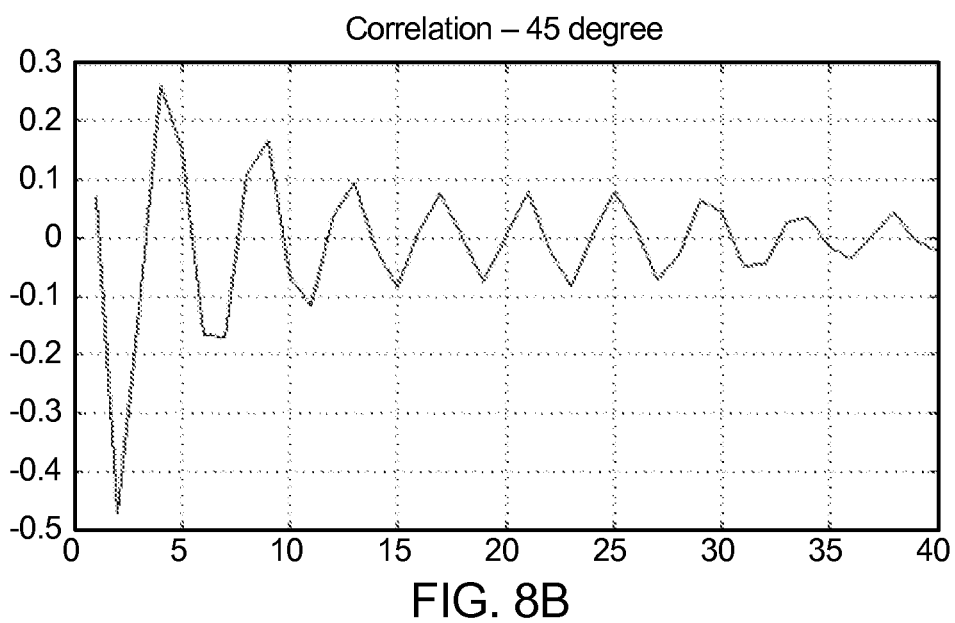
Figure 8C:
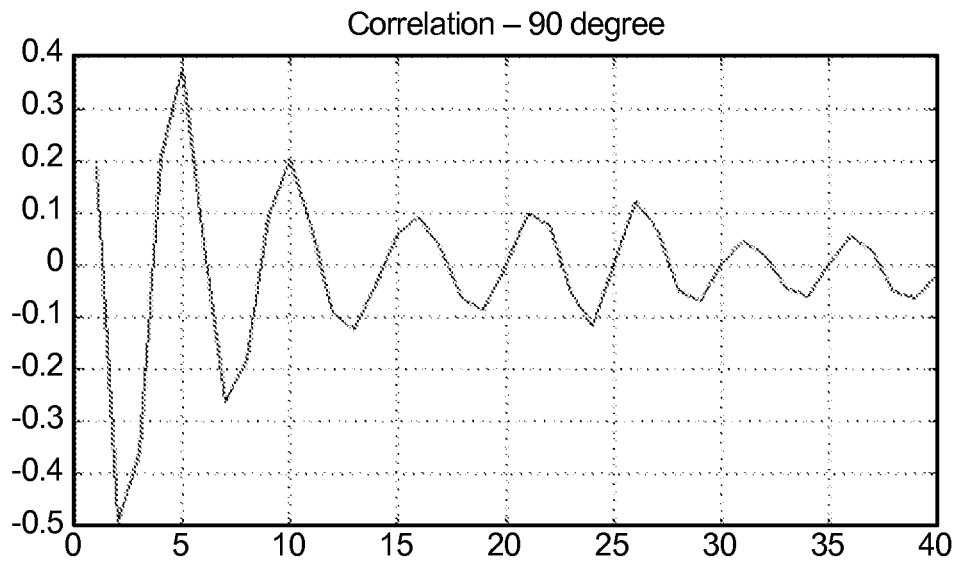
Figure 8D:
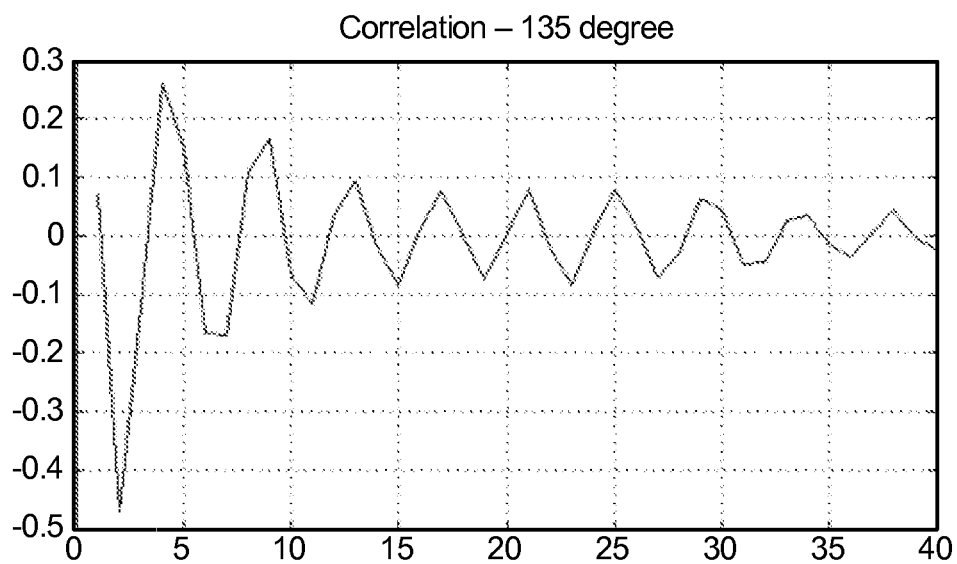

FIGS. 8A-8D show simulation results of correlations performed for the situation where a user finger moves away from a microphone. FIG. 8A illustrates the correlation results from applying Equation 4 at 0 degree. FIG. 8B illustrates the correlation results from applying Equation 4 at 90 degrees. FIG. 8C illustrates the correlation results from applying Equation 4 at 45 degrees. FIG. 8D illustrates the correlation results from applying Equation 4 at 135 degrees. The degree indicates the direction of gradient change of filter coefficients as follows:

0 degree=[−1 0 1; −1 1 1; −1 0 1]
90 degree=[1 1 1; 0 1 0; −1 −1 −1]
45 degree=[0 1 1; −1 1 1; −1 −1 0]
135 degree=[1 1 0; 1 1 −1; 0 −1 −1].

FIG. 9A shows simulation results of an angular second order correlation performed for the situation where a user finger moves away from a microphone.

FIG. 9B shows simulation results of an inverse difference matrix correlation performed for the situation where a user finger moves away from a microphone.

FIG. 9C shows simulation results of a difference entropy correlation performed for the situation where a user finger moves away from a microphone.

In a further embodiment, frequency domain features may also be extracted. In this embodiment, a power spectrum density may be obtained by applying a two-dimensional fast Fourier transform (FFT) to difference channel impulse response images. The power spectrum density may show more low frequency components when a reflector moves toward a receiver and more high frequency components when a reflector moves away from a receiver, and thus may provide further information that may be used to recognize or categorize user input gestures.

In a further embodiment, ring and wedge sampling of the FFT results may be used to identify impulse response wave directions. Ring and wedge sampling may be done over a series of radially aligned semi-annular regions and wedge regions extending from the center of the reflection detection zone. Sampling of semi-circular ring areas may provide orientation-independent information about the distribution of spatial frequencies in the difference channel impulse response image, while sampling of angular wedge areas may provide scale-independent information.

Classifications of difference channel impulse response images may be used to identify the strongest reflection points for use in making time of flight calculations that can be used to determine a location of the strongest reflection point in 3-D space. The time of flight may be calculated for identified reflection points. The transmitter and number of receivers may be synchronized to the same system clock and thereby eliminate the need for timestamping of the ultrasound transmissions. Thus, the time of flight measurements for each receiver may simply be the difference of the transmission time of a signal and the reception time for a matched signal.

Time of flight values may be used to determine the coordinates of the reflection points in three dimension space. Coordinates may be in a frame of reference with origin at the transmitter, the receiver or some other location. The coordinates of the receivers relative to the origin may be previously known or determined. The coordinates of a reflection point may be determined by converting the time of flight values of three or more receivers into distances based on an ultrasound speed and using the distances in an elliptical intersect method. The speed of sound may assumed as a constant, a, as channel conditions are not likely to fluctuate drastically in the short period between each measurement, but the constant may need to be adjusted over time in changing channel conditions. The following equations may be used where x, y, z are the reflection coordinates, mx1, my1, mz1 are the coordinates of mic1, and 0, 0, 0 are the speaker coordinates.

$$\sqrt{(x-mx1)^2+(y-my1)^2+(z-mz1)^2} + \sqrt{x^2+y^2+z^2} = \text{Time of Flight } 1*a$$

$$\sqrt{(x-mx2)^2+(y-my2)^2+(z+mz2)^2} + \sqrt{x^2+y^2+z^2} = \text{Time of Flight } 2*a$$

$$\sqrt{(x-mx3)^2+(y-my3)^2+(z-mz3)^2} + \sqrt{x^2+y^2+z^2} = \text{Time of Flight } 3*a$$

The time of flight values to be used for determining reflection coordinates may be noisy. To address this, a Kalman filter may be used to overcome noisiness and determine the reflection coordinates. For nonlinear systems, an extended (EKF) or "unscented Kalman filter" may be used. Kalman filters predict the true value of measurements and calculated estimates by weighting and combining predicted values and measured values. A Kalman filter may predict a value and estimate the uncertainty of the predicted value. A Kalman filter process may assign a weighting to the predicted value based upon uncertainty, with higher weights going to more certain values, and then compute a weighted average with measured values. In this manner, noisy measured values may be adjusted to be closer to the true value because the weighted average has a better estimated uncertainty than either the predicted value or the measured value.

Figure 10A:
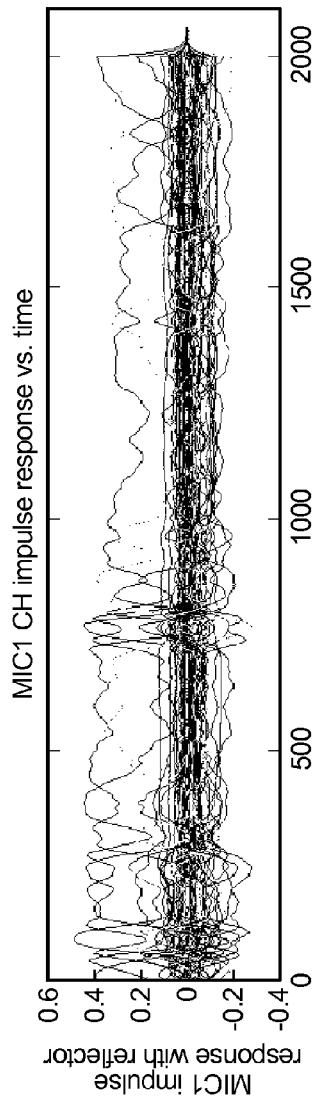
FIGS. 10A-10C are graphs illustrating channel impulse responses versus time for a user gesture as measured by three spaced apart microphones in a prototype system.
Figure 10B:
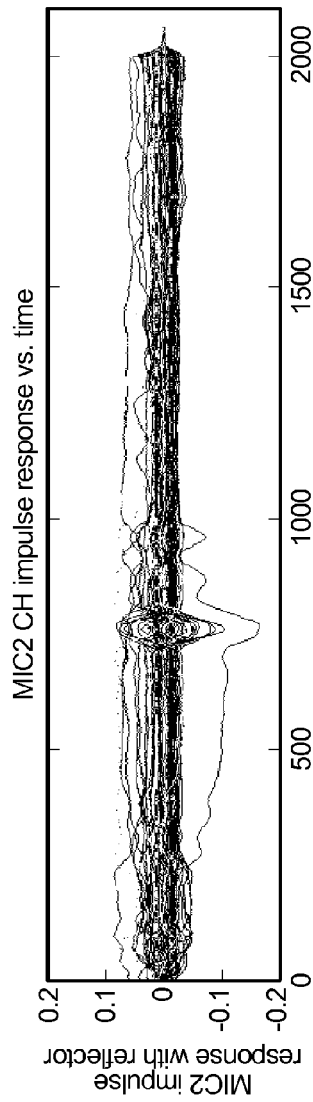
Figure 10C:
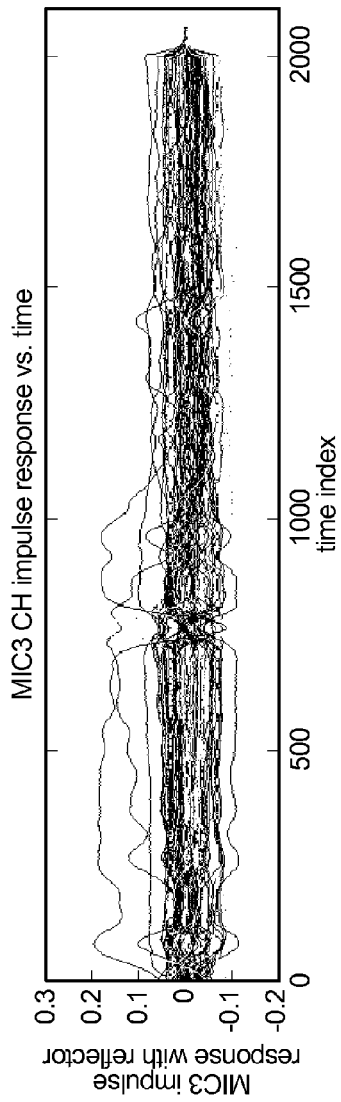

FIGS. 10A-10C show results of Kalman filtering of data generated in a simulation of a user finger hovering about 1 cm above the surface of a computer device with three microphones. FIG. 10A shows simulation channel impulse response versus time results for the first microphone. FIG. 10B shows simulation channel impulse response versus time results for the second microphone. FIG. 10C shows simulation channel impulse response versus time results for the third microphone. Since the microphones are positioned at different locations on the computing device, they exhibit different channel impulse responses.

Figure 11A:
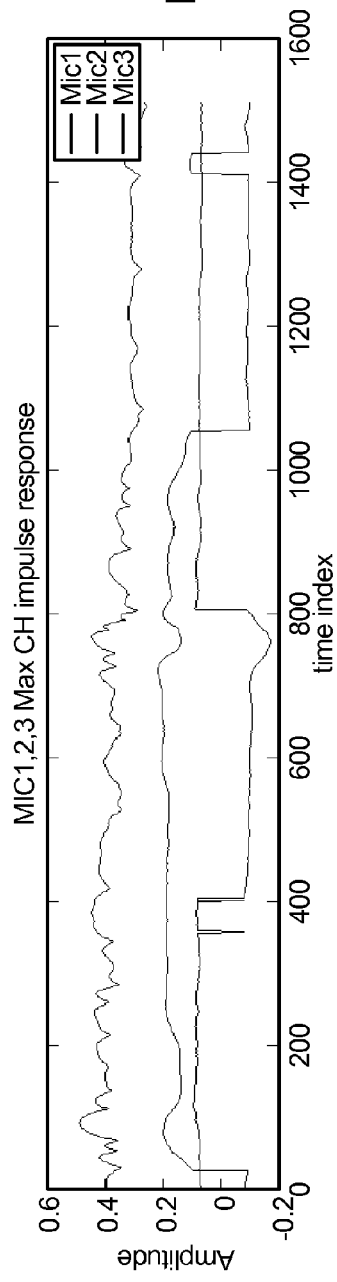
FIG. 11A is a graph illustrating maximum impulse responses values versus time determine from the channel impulse responses versus time illustrated in FIGS. 10A-10C.
Figure 11B:
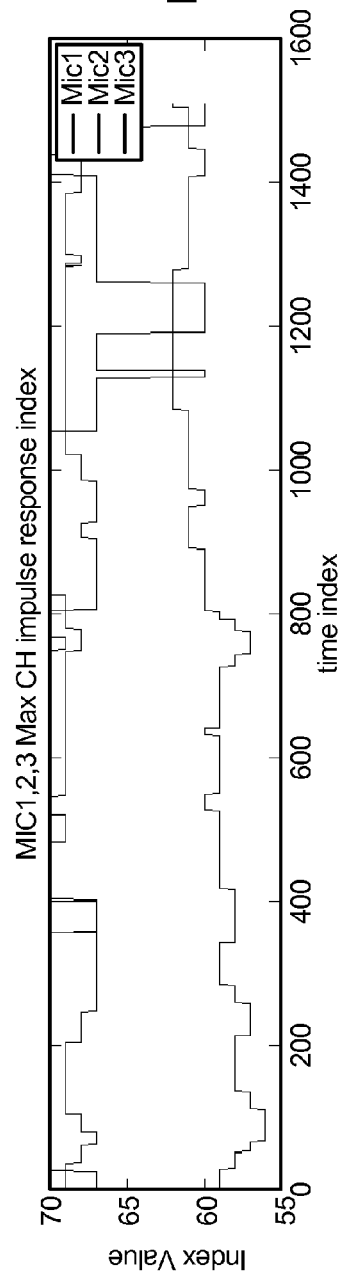
FIG. 11B is a graph illustrating maximum impulse responses indexes versus time determine from the channel impulse responses versus time illustrated in FIGS. 10A-10C.
Figure 11C:
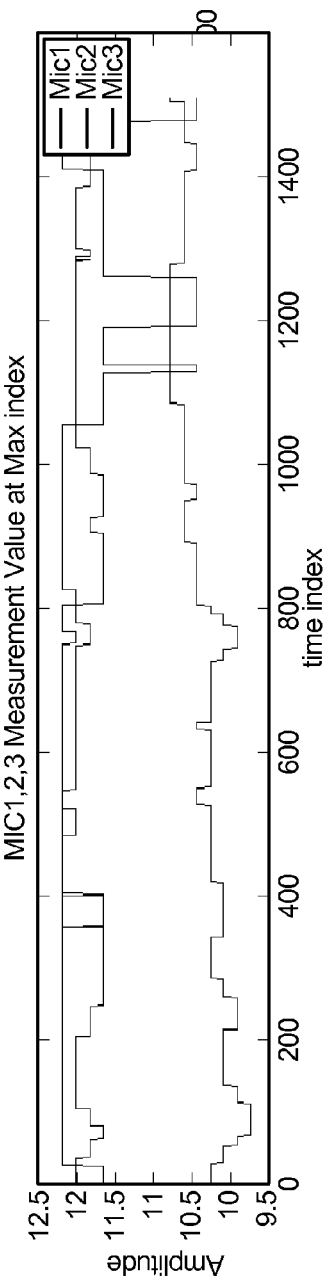
FIG. 11C is a graph illustrating the measured value of the impulse responses versus time at the maximum index determine from the channel impulse responses versus time illustrated in FIGS. 10A-10C.

Using the Kalman filtered results, the maximum channel impulse response value, index and the distance to the maximum signal may be determined. FIG. 11A shows the maximum amplitude of the channel impulse response versus time determined from the processing illustrated in FIGS. 10A-10C for all three microphones. FIG. 11B shows the index value of the channel impulse response versus time determined from the processing illustrated in FIGS. 10A-10C for all three microphones. FIG. 11C shows the amplitude of the measurement value at the maximum index versus time determined from the processing illustrated in FIGS. 10A-10C for all three microphones.

Once the gesture features are defined, training data sets (gesture features) can be used to train the classifier. The classifier may be a simple KNN classifier or more complex ANN or HMM model. Features extracted by the foregoing analysis methods may be correlated with specific user input gestures, such as may be defined in a user training sequence. Well known pattern comparison or correlation methods may be used to compare patterns extracted from the channel impulse response to patterns stored in memory. Three examples of correlation methods that may be used for this purpose are k-nearest neighbors algorithms, artificial neural networks analysis, and hidden Markov Models. The artificial neural networks or hidden Markov models may have been previously trained in a learning phase. These three example correlation methods are described in more detail below; however, other correlation methods may also be used in a similar manner.

The k-nearest neighbor algorithm classifies an object by a majority vote of a number, k, of the nearest neighbors. Neighbors are taken from a set of already correctly classified objects, in this case patterns extracted from difference channel impulse response images. Rules are set defining which classified objects, or neighbors, are closest. For example, certain features or changes in coordinates may be neighbors and classified or correlated with certain gestures ahead of time. Patterns extracted from difference channel impulse response images to be classified may have features extracted with values close to certain neighbors. Depending on the parameter k selected, a number of neighbors may be compared. If k equals five, the five neighboring patterns with the closest feature values may determine what the patterns extracted from difference channel impulse response images is classified as. If a majority of five neighbors are correlated with a certain gesture, the patterns extracted from difference channel impulse response images may be correlated with the same gesture as the majority. Using such a comparison algorithm, it is possible to weight the votes of neighbors by closeness or any other one or more properties.

Artificial neural networks is a comparison method that uses calculation of objects that function as interconnected group of artificial neurons that may change structure based on information flowing in the network during a learning phase. Connections in the neural network may vary in strength or weighting. Each artificial neuron may be a simple processing node or function, but the network as a whole may exhibit complex behaviors. An artificial neural network may learn by using a set of observations to find optimal solutions to a task where optimal is measured according to a predefined cost function. For example during a learning phase, a user may be asked to perform a particular user input gesture a number of times so that a number of observations can be obtained. The observations or patterns extracted from difference channel impulse response images may be fed into the neural network and run through the various nodes and connections to generate solutions. The solutions generated by the neural network may be ranked according to a cost function. Weighting of connections may be adjusted based on this ranking. Once properly trained, the neural network's weighting values may be fixed. A neural network may be used for pattern recognition or classification of gestures by comparing patterns extracted from difference channel impulse response images to learn the patterns from the training session. Solutions may be analogous to certain user input gestures. Features or changes in coordinates may serve as the input for a previously trained neural network that would then connect the input with a solution or gesture based on the neural network structure. The neural network may be previously trained with known gestures or features in a learning phase.

A hidden Markov model assumes that the system being modeled is a Markov process with an unknown state but with known tokens dependent on the state. A Markov process is a process in which a state fluctuates over time and in which future states depend only upon the present state and no previous states. Each possible state has a probability distribution over the possible tokens and probability distribution as to which state will come next. Therefore, the tokens give some information about the sequence of states in the process. In gesture recognition, the states may be analogous features associated with user input gestures and the tokens may be analogous with the patterns extracted from difference channel impulse response images. The probability distributions over tokens and between states may be predefined parameters or may be set in a learning phase. Patterns extracted from difference channel impulse response images of known gestures or features can be input to train and develop parameter values of the model in a learning phase. The most likely sequence of states or gestures may be determined recursively from the trained Hidden Markov model, such as by the Viterbi algorithm.

In a further embodiment, simple gesture recognition tasks, such as identifying a reflector's moving directions, may be accomplished using angle features derived directly from the impulse response curve. FIGS. 12A through 16C illustrate how the impulse response patterns for different reflector movements and their corresponding response curve angle information may be recognized.

Figure 12A:
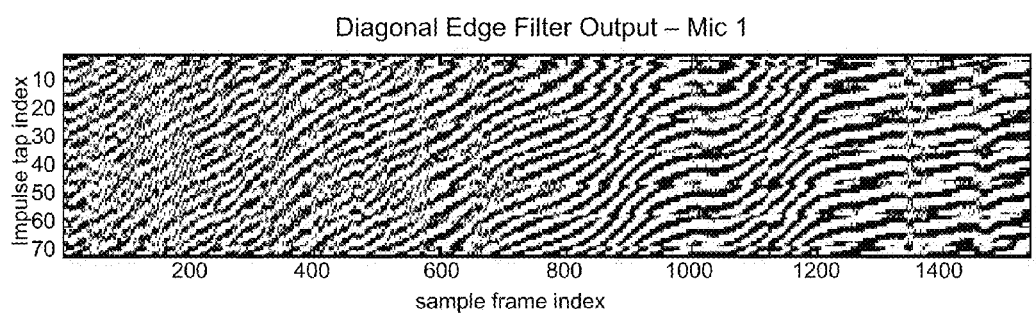
FIGS. 12A-12C are graphs of raw impulse responses determinations versus time for three microphones in the presence of a moving reflector.
Figure 12B:
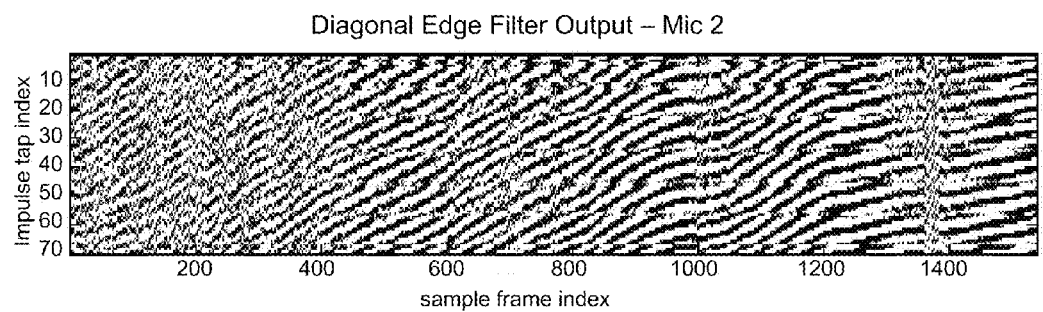
Figure 12C:
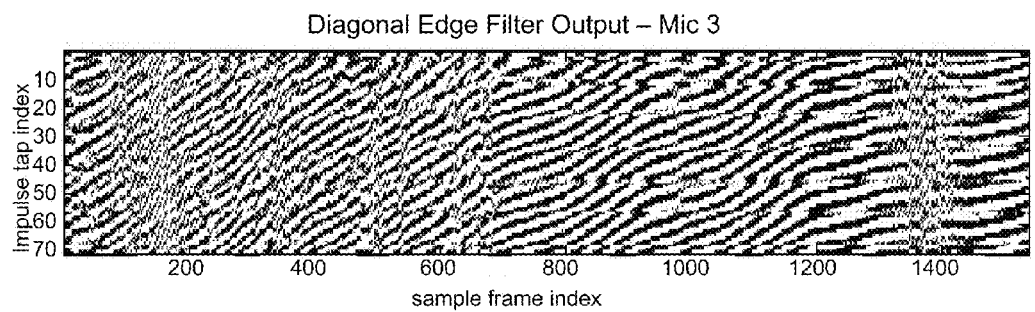

Graphs of the impulse response determinations for each of three microphones in a prototype in the presence of a finger moving towards the microphones are illustrated in FIGS. 12A through 12C. These figures show the raw impulse response determinations after processing with a diagonal edge filter. As can be seen in these figures, the motion of a user's finger toward the microphone may result in a perceivable angle in the impulse response determinations as a function of time, as indicated in the sample frame index.

While the raw impulse response determination is made with real recognizable features, such features may be enhanced by processing the signals using a low pass filter on the block channel impulse response. An example of a low pass filter in the form of a 5×5 matrix of values one is:

$$M = \begin{bmatrix} 1 & 1 & 1 & 1 & 1 \\ 1 & 1 & 1 & 1 & 1 \\ 1 & 1 & 1 & 1 & 1 \\ 1 & 1 & 1 & 1 & 1 \\ 1 & 1 & 1 & 1 & 1 \end{bmatrix}$$

Figure 13A:
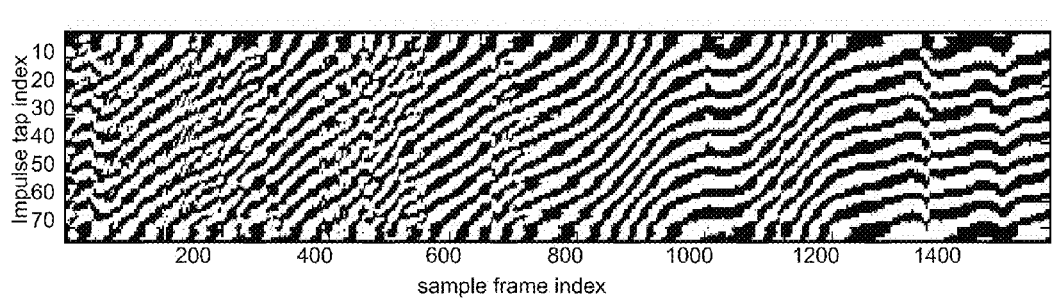
FIGS. 13A-13C are graphs of low-pass filtered and thresholded impulse responses determinations versus time for three microphones in the presence of a moving reflector.
Figure 13B:
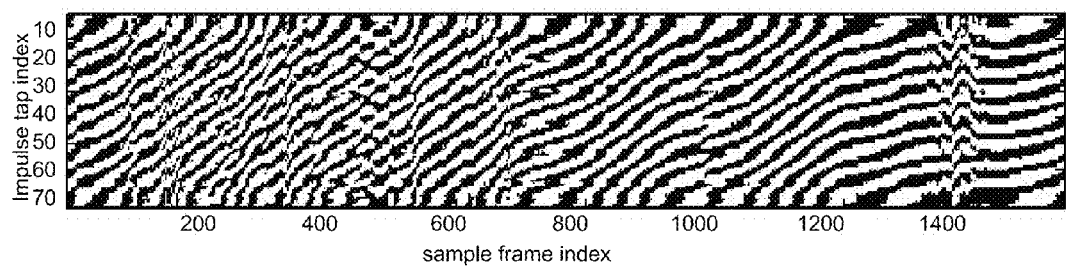
Figure 13C:
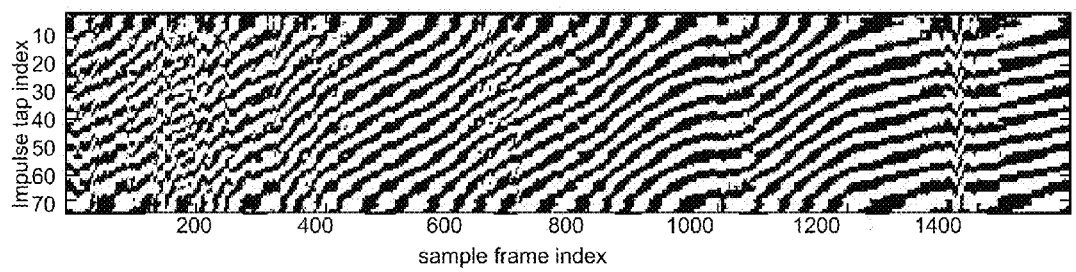

Graphs of the impulse response determinations for each of three microphones in a prototype in the presence of a finger moving towards the microphones after processing with a loop low pass filter are illustrated in FIGS. 13A through 13C. As these figures reveal that applying the low pass filter to the impulse response provides a more distinct pattern which can be used to determine the angle of the impulse response.

Since the angle of the pattern in the impulse response can be easily determined, this angle can be used as a recognizable feature that can be linked to a particular movement. For example, an angle less than 90 degree may mean a reflector (e.g., a user's hand or finger) is moving closer to the microphone, while an angle between 90 and 180 degree may mean that a reflector is moving away from the microphone. Such a user movement may then be correlated to a particular user interface command (e.g., a mouse pointer movement) using a simple table look up method.

Figure 14:
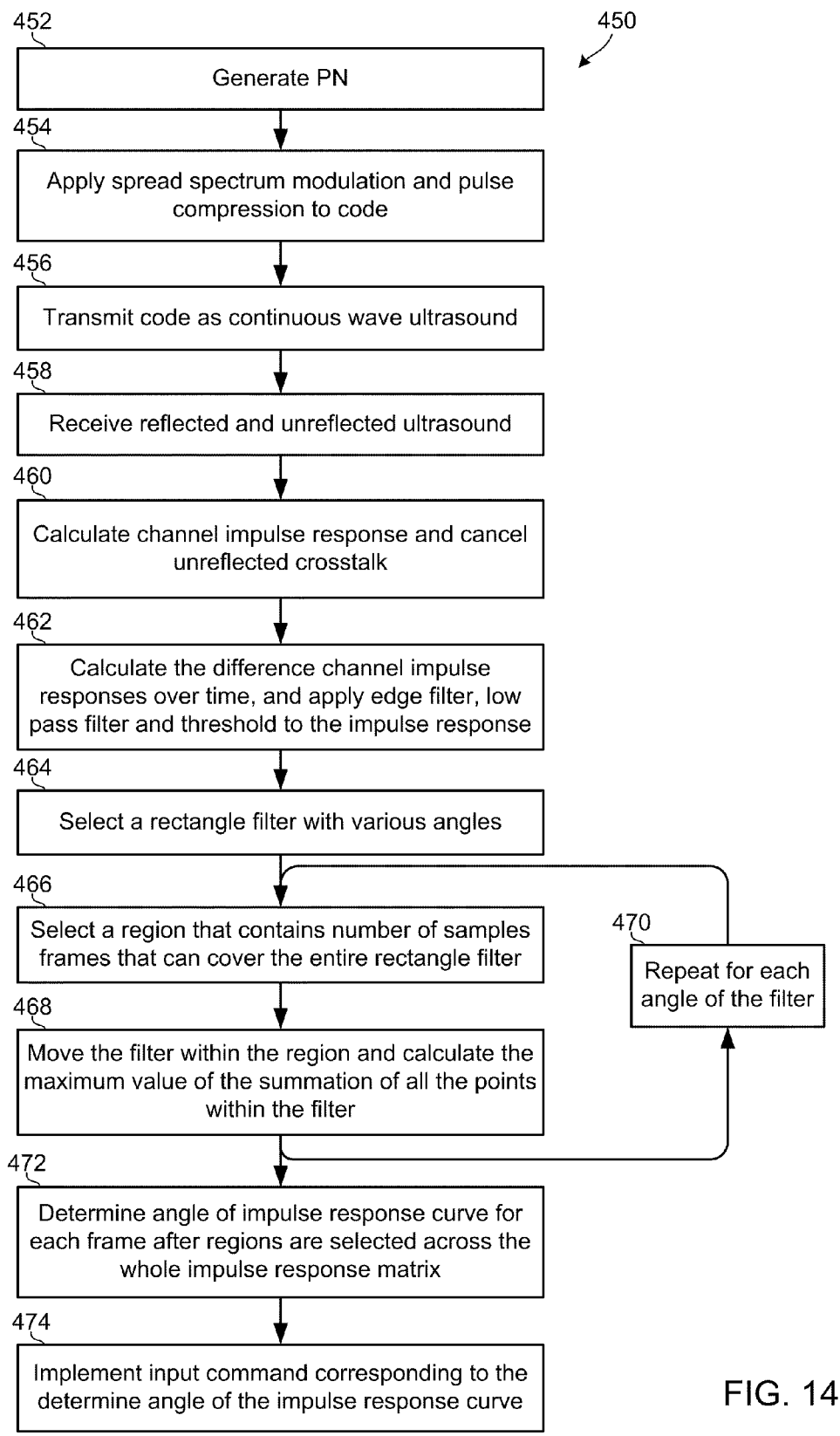
FIG. 14 is a process flow diagram of an embodiment method for recognizing a user interface gesture from reflected ultrasound signals based on a determined angle of the impulse response.

FIG. 14 illustrates an embodiment method 450 which may be implemented in a computing device to recognize user input gestures from ultrasound reflected from a user's hand within a reflection detection zone b.ased on determining the angle of the impulse response. In method 450 in step 452, a processor may generate a pseudorandom noise or pseudorandom number code, or other temporal encoding information, and encode that information in a spread spectrum modulation with pulse compression in step 454. This encoded signal is then emitted as a continuous wave ultrasound from an ultrasound emitter in step 456. Ultrasound, including reflected and cross talk signals, is received at an ultrasound detector in step 458. In step 460, a processor (e.g., a DSP) may calculate a channel impulse response based on the received ultrasound signal. As part of step 460, the processor may subtract a baseline channel impulse response to obtain a reflected channel impulse response using the methods described above. In step 462, the computing device processor may calculate the difference channel impulse response over time, and maintain a series of those values as difference channel impulse response images using calculation methods described above. Also as part of step 462, the computing device processor may apply an edge filter, low pass filter and thresholding operations to the calculated difference impulse response. In step 464, the processor may select a rectangular filter with various filtering angles. In step 466, the processor may select a region of the channel impulse response that contains a certain number of samples frames that can cover the entire rectangle filter. In step 468, the processor may move the filter within the region while summing the points within the filter in order to calculate the maximum value of the summation of all the points within the filter. In step 470, the processor may repeat steps 466 and 468 for each angle of the selected rectangular filter. Once all of the angles of the filter have been processed, in step 472, the processor may determine the angle of the impulse response curve for each frame after the regions are selected across the whole impulse response matrix. In step 474, the processor implement the user input command corresponding to the determine angle of the impulse response curve. As part of step 474, the computing device may display a user interface image corresponding to the implemented user input command in a manner similar to other user interface systems.

Determining that the angle of the impulse response curve in step 472 may utilize the following equation:

$$Rect_j = \sum_{t=t0}^{tmax} \sum_{n=1}^{M} p(n, t)$$

where p(n,t) is the amplitude of the impulse response at point (n,t) in any of FIGS. 13A-13C, and (t0, tmax, M) is the size of the rectangular filter. The angle may then be determined as the maximum argument of $Rect_i$. In other words: Angle=argmax ($Rect_i$), where i=1:N. N is the number of equally divided angles, and the increment step of each angle is π/N.

Figure 15A:
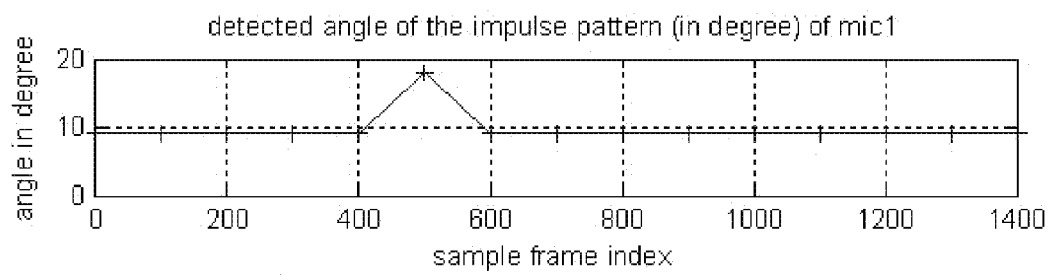
FIGS. 15A-15C are graphs of detected angles of the impulse responses patterns shown in FIGS. 13A-13C, respectively.
Figure 15B:
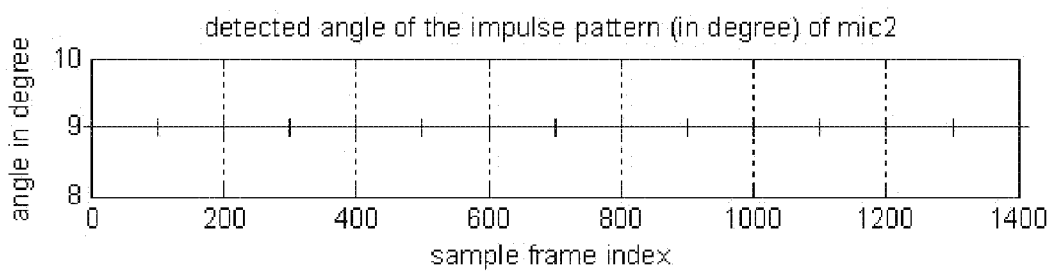
Figure 15C:
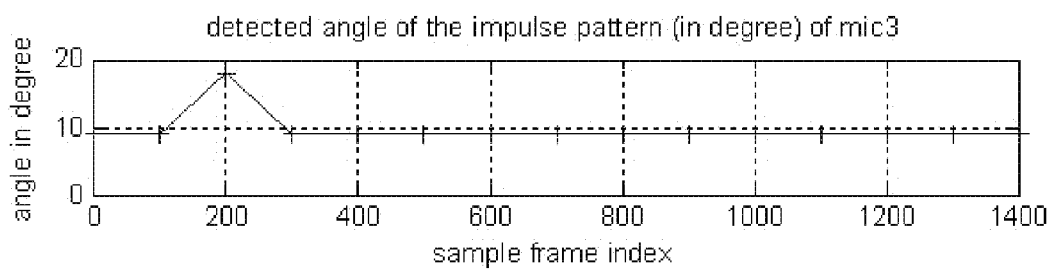
Figure 16A:
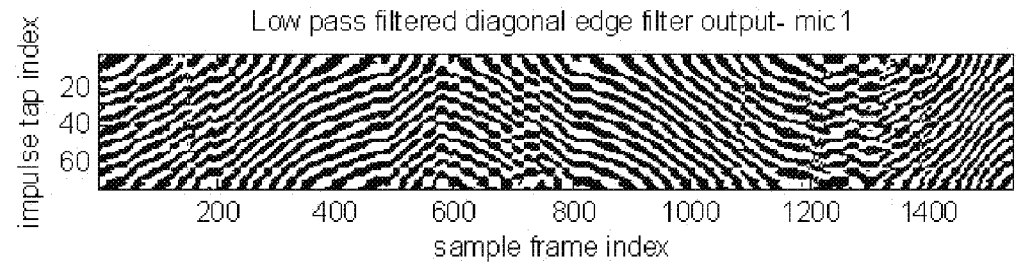
FIGS. 16A-16C are graphs of low-pass filtered impulse responses determinations versus time for three microphones in the presence of a reflector moving towards and away from the microphones.
Figure 16B:
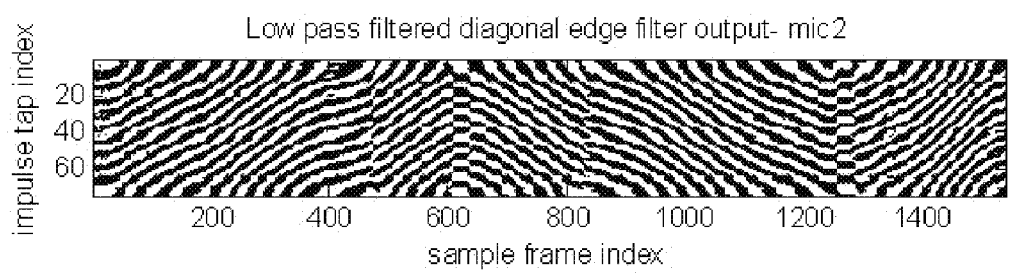
Figure 16C:
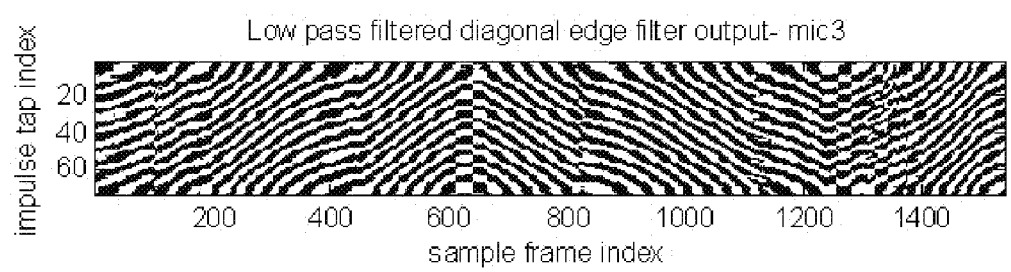

As part of the process of recognizing a user input gesture using these methods, the angle of the impulse response curve may be plotted over time as illustrated in FIGS. 15A-15C. These figures illustrate the change in the detected angle of the impulse pattern in degrees as a function of the sample frame index for the case where the user's finger is moving towards the three microphones of the system.

The derived angle of the impulse response curve from all three microphones can uniquely determine the reflector moving directions in 3D space. As illustrated in FIGS. 15A-15C, the change in angle over time will differ for each of the three microphones when they are positioned in different locations on or in the vicinity of the computing device. Two microphones may be used to determine the direction of reflector movement when it is moving parallel to a line connecting the two microphones.

Figure 17A:
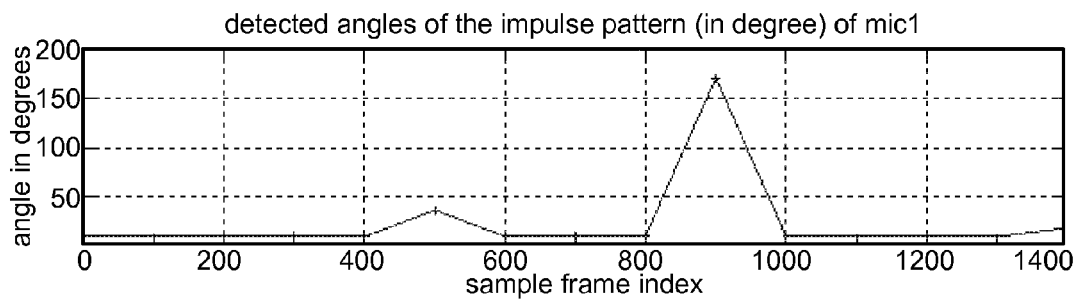
FIGS. 17A-17C are graphs of detected angles of the impulse responses patterns shown in FIGS. 16A-16C, respectively.
Figure 17B:
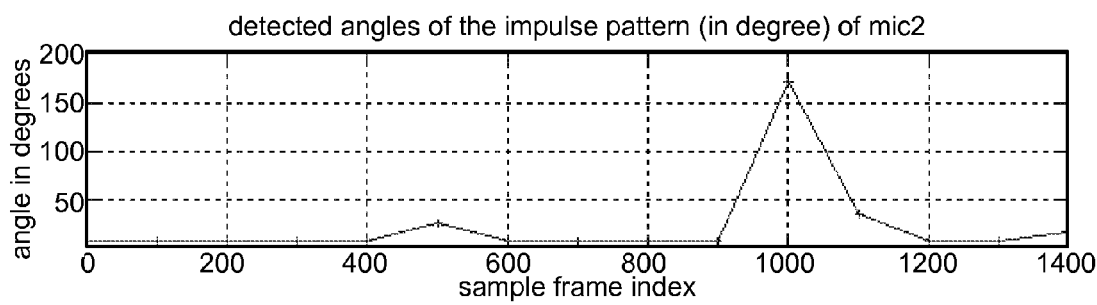
Figure 17C:
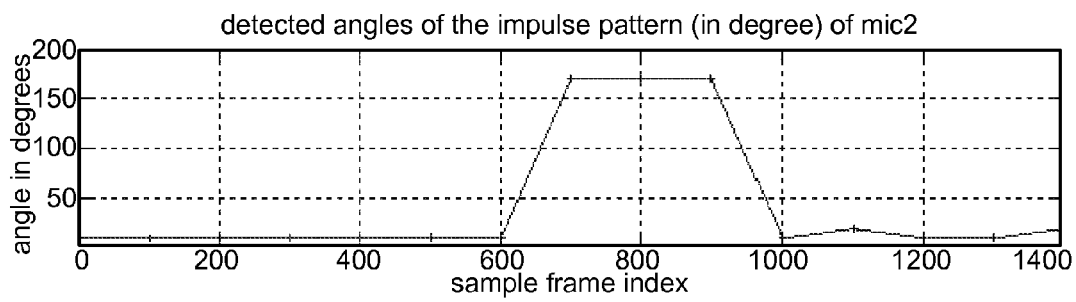

This method may be used for recognizing more complex user input gestures, such as a user's finger moving towards and away from the system microphones, as illustrated in FIGS. 16A through 17C. For example, FIGS. 16A-16C graph the impulse response determinations for each of three microphones in a prototype in the presence of a finger moving towards and then away from the microphones after processing with a loop low pass filter. These figures reveal how the angle of the impulse response curve changes from a first value to a second value and then back again as the user's finger moves towards, then away, and then towards the microphones. FIGS. 17A-17C graph the angle of the impulse response curves for the impulse response curves shown in FIGS. 16A-16C for each of the three microphones in the system.

The embodiment analysis methods enable gesture recognition while avoiding the need to demodulate the received ultrasound because imaging the reflector is not necessary for gesture recognition. The ultrasound does not serve as a carrier of information from the transmitter, but rather as a collector of information about the reflector (i.e., the user's hand) with the information extracted in the form of the channel impulse response as affected by any reflecting surfaces within the reflection detection zone. By relying on patterns and features of the channel response, the embodiment methods avoid the data intensive process of resolving or forming an image of a reflecting surface, such as the user's hand. Instead, gesture recognition is accomplished by relying on changes in the channel impulse response without having to map the reflected data or determining what the channel is.

Figure 18:
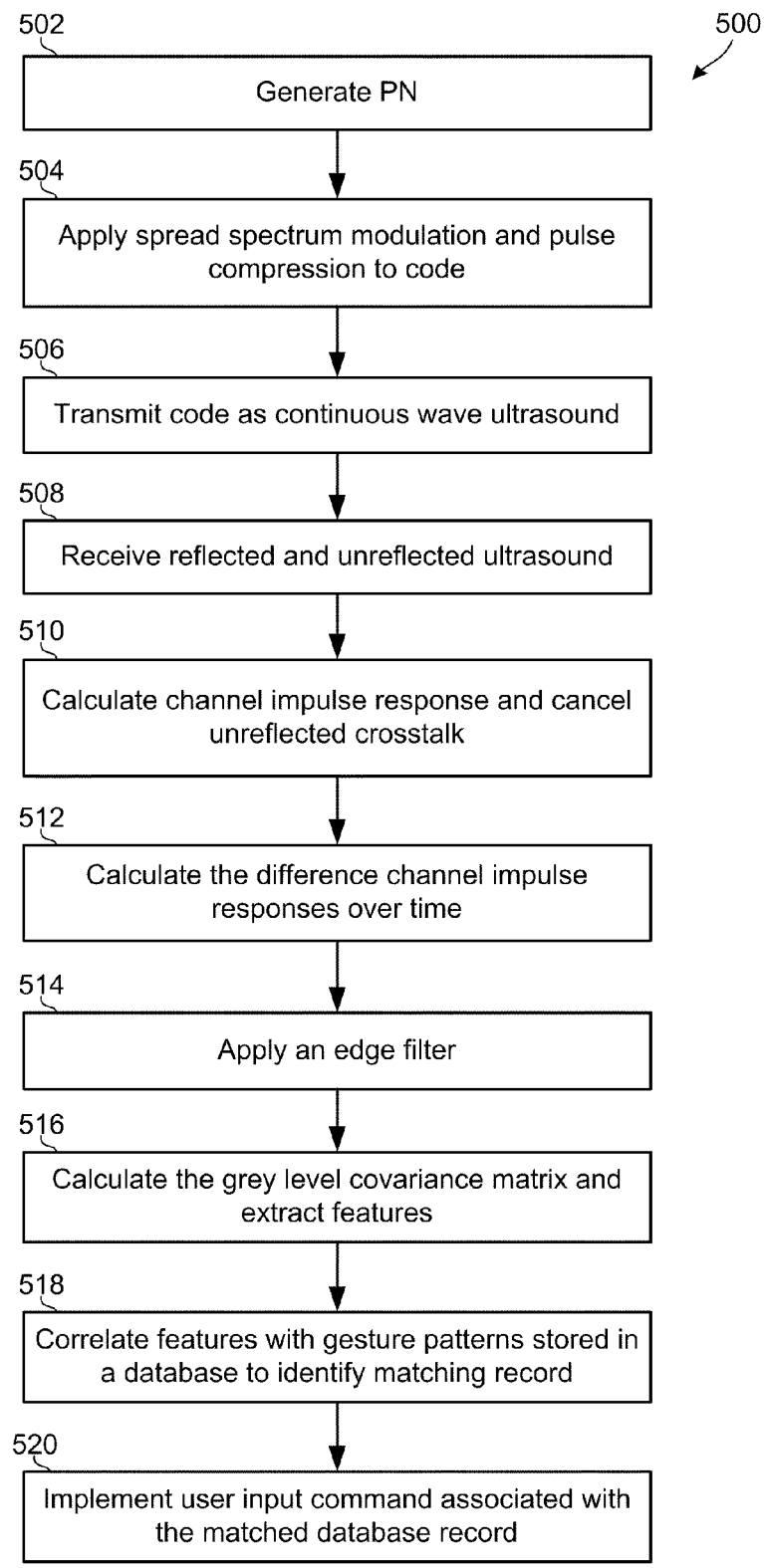
FIG. 18 is a process flow diagram of an embodiment method for recognizing gestures based on signal features extracted from a channel impulse response.

FIG. 18 illustrates an embodiment method 500 which may be implemented in a computing device to recognize user input gestures from ultrasound reflected from a user's hand within a reflection detection zone. In method 500 in step 502, a processor may generate a pseudorandom noise or pseudorandom number code, or other temporal encoding information, and encode that information in a spread spectrum modulation with pulse compression in step 504. This encoded signal is then emitted as a continuous wave ultrasound from an ultrasound emitter in step 506. Ultrasound, including reflected and cross talk signals, is received at an ultrasound detector in step 508. In step 510, a processor (e.g., a DSP) may calculate a channel impulse response based on the received ultrasound signal. As part of step 510, the processor may subtract a baseline channel impulse response to obtain a reflected channel impulse response using the methods described above. In step 512, the computing device processor may calculate the difference channel impulse response over time, and maintain a series of those values as difference channel impulse response images using calculation methods described above. In step 514, the processor may apply an edge filter to the difference channel impulse response images to highlight recognizable features. In step 516, the processor may calculate a grey level covariance matrix in order to extract recognizable features from the edge filtered difference channel impulse response images. In step 518, the processor may compare the extracted features from the edge filtered difference channel impulse response images to patterns as stored in a database associated with user gestures in order to identify a matching record. As discussed above, step 518 may involve comparing patterns for gestures that are relevant to our current operating state or application in the computing device, or other state related considerations. The processing in step 518 may use correlation methods such as k-nearest neighbors, artificial neural nets, and hidden Markov models. The results of step 518 may be an identified user input command associated with the matched gesture pattern. In step 520, the computing device may implement the identified user command associated with the matched pattern. As part of step 520, the computing device may display a user interface image corresponding to the recognize gesture in a manner similar to other user interface systems.

The processes illustrated in FIG. 18 may also be used in a training sequence, with the exception that the user may be prompted to perform a particular gesture, and instead of comparing the extracted features in step 518, the processor may store the extracted features in a database.

Figure 19:
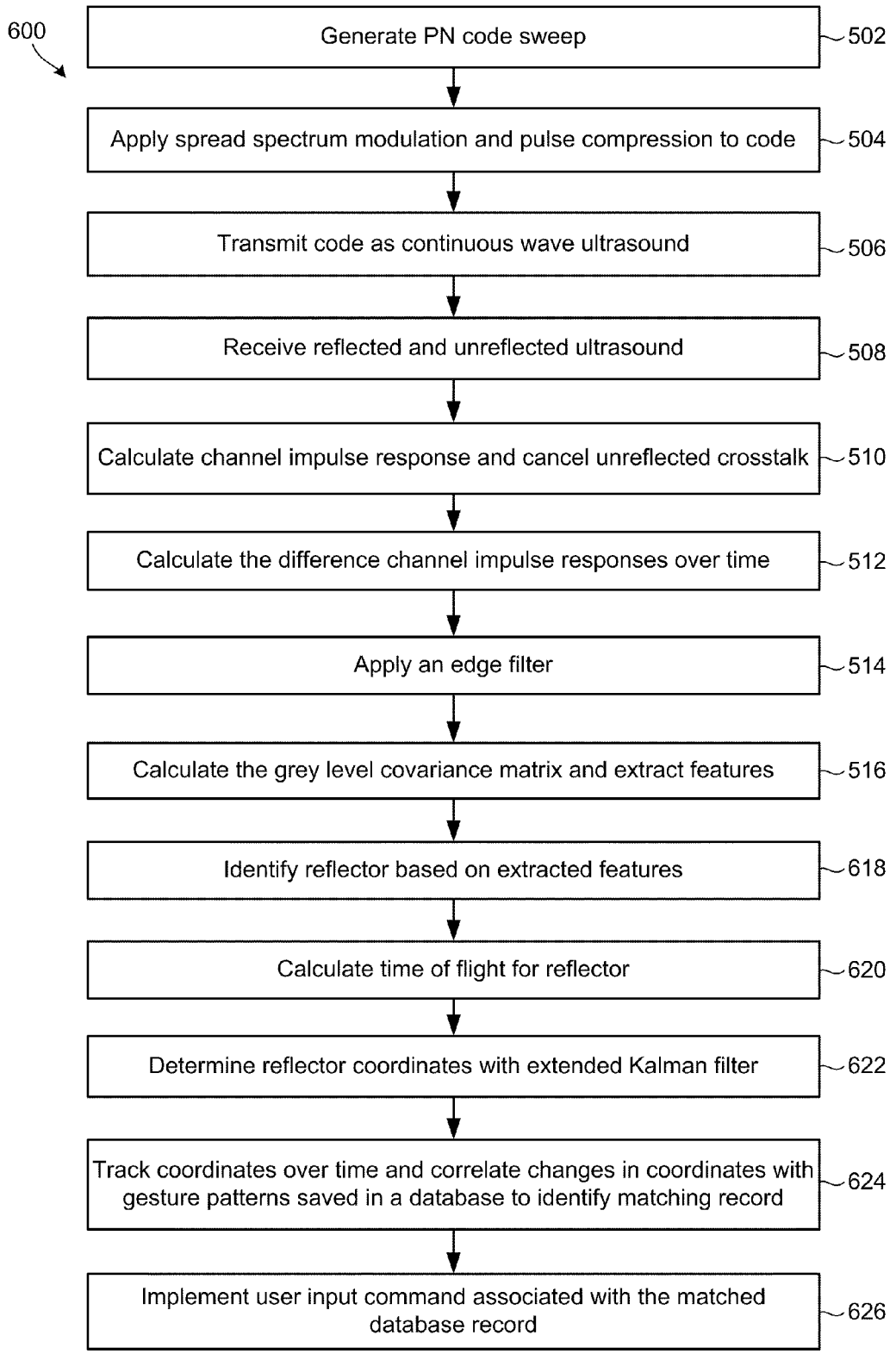
FIG. 19 is a process flow diagram of an embodiment method for recognizing gestures based on signal features extracted and a change in coordinates of a reflector.

FIG. 19 illustrates an alternate embodiment method 600 in which the feature extraction and correlation steps of method 500 may be used to identify a reflecting object and recognize motion of the object. As in method 500, a temporally encode ultrasound signal may be generated and emitted in steps 502-506. The ultrasound signal and reflections from a user's hand may be received and processed to obtain a difference channel impulse response images in steps 508-512. The difference channel impulse response images may be edge filtered and analyzed with a grey level covariance matrix to extract recognizable features in steps 514-516.

Unlike method 500, in method 600 the extracted features may be used to identify reflection points of interest for time of flight calculations in step 618. The selection of points of interest based on extracted features may rely on the same correlation methods used in step 516. These methods may be used to correlate the extracted features indicating strong primary or secondary reflectors. With a proper grouping of the strong reflections, primary reflectors may be distinguished and identified as the main reflectors. In step 620, time of flight values may be determined by calculating the difference in time from transmission and reception of signals reflected from identified main reflection points. In step 622, coordinates of the identified reflection points may be calculated with the same methods and equations discussed above including Kalman filtering to overcome noisiness in time of flight values. In step 624, coordinates of identified reflection points may be tracked over time, with changes in coordinates calculated and (optionally) correlated with user input gestures in step 624. In step 626, the computing device implements the identified user command associated with the matched pattern. As part of step 626, the computing device may display a user interface image corresponding to the recognize gesture, including its location within 3-D space as determined in steps 620-622, in a manner similar to other user interface systems.

The processes illustrated in FIG. 19 may also be used in a training sequence, with the exception that the user may be prompted to perform a particular gesture, and instead of comparing the extracted features in step 624, the processor may store the extracted features in a database.

An example computing system in the form of a laptop computer 700 suitable for use with the various embodiments, including example positions for the ultrasound emitter 101 and microphones 102a, 102b, and 102c, is illustrated in FIG. 20. Many laptop computers include a touch pad touch surface that serves as the computer's pointing device. A laptop computer 700 will typically include a processor 701 coupled to volatile memory 702 and a large capacity nonvolatile memory, such as a disk drive 703. The computer 700 may also include a floppy disc drive 704 and a compact disc (CD) drive 705 coupled to the processor 701. The computer device 700 may also include a number of connector ports coupled to the processor 701 for establishing data connections or receiving external memory devices, such as a USB or FireWire® connector sockets or other network connection circuits 706 for coupling the processor 701 to a network. In a notebook configuration, the computer housing includes the touchpad 707, keyboard 708 and the display 709 all coupled to the processor 701.

An ultrasound transmitter 101 and receivers/microphones 102a-102c may be integrated with the laptop computer 700 in locations on the system housing selected to facilitate 3-D coordinate calculations based on time of flight differences. In some embodiments, the ultrasound transmitter 101 and receivers/microphones 102a-102c may also serve as a computing device speaker and microphones for other audio functions. The gestures determined by an embodiment system or method may serve as input for the computer 700 and be used to control programs thereon or to interact with a graphical user interface. In various embodiments the ultrasound touchless sensing capability may augment or replace the touchpad 707 or keyboard 708.

Figure 21:
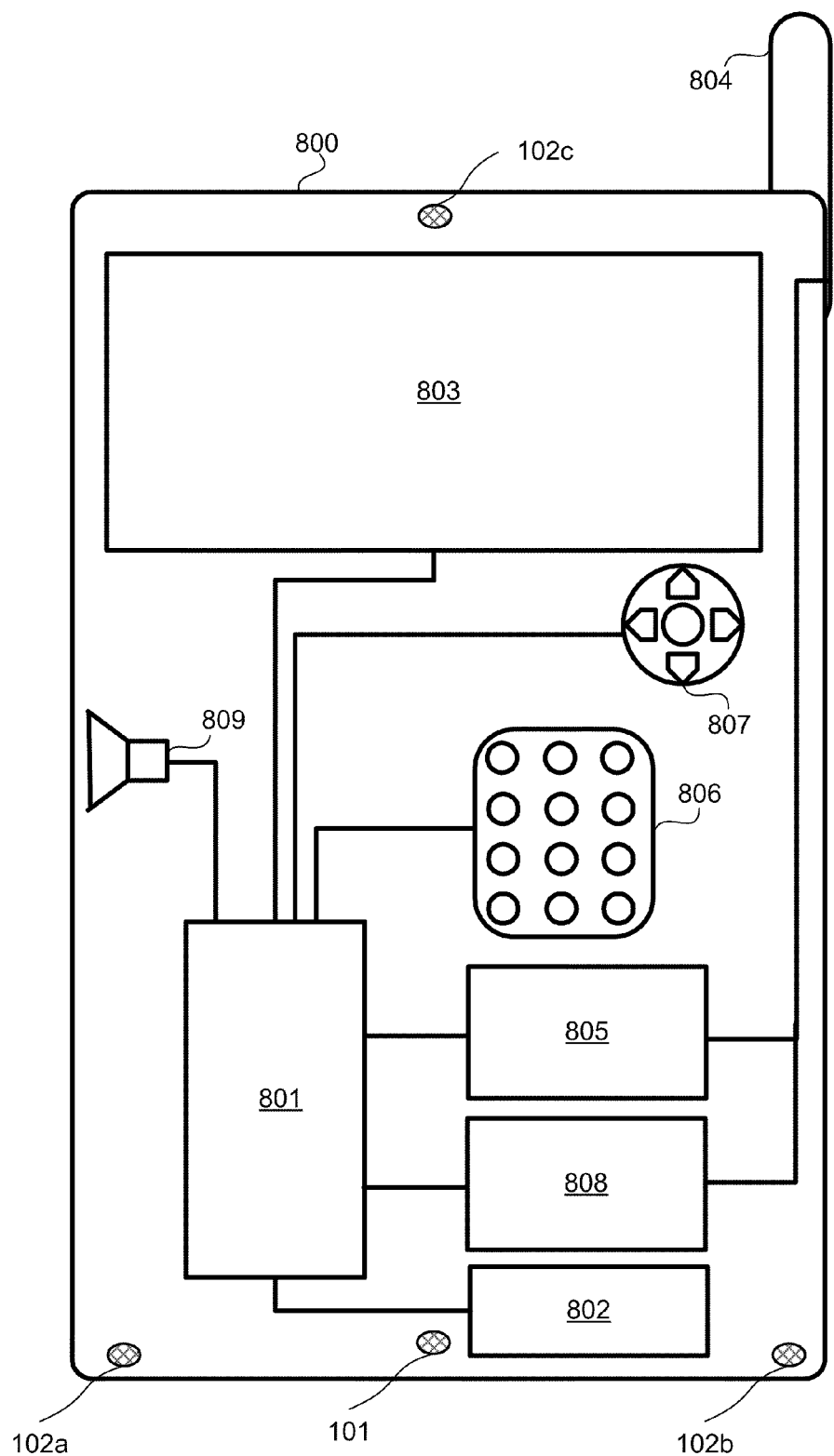
FIG. 21 is a component block diagram of an example mobile device suitable for use with the various aspects.

Mobile devices, such as cell phones or PDAs, may also be configured to use the various embodiments. Typical mobile devices 800 suitable for use with the various embodiments may include the components illustrated in FIG. 21. For example, an exemplary mobile receiver device 800 may include a processor 801 coupled to internal memory 802, a display 803, and a speaker 809. Additionally, the mobile device 800 may have an antenna 804 for sending and receiving electromagnetic radiation that is connected to a wireless data link and/or cellular telephone transceiver 805 coupled to the processor 801 and/or a mobile multimedia broadcast receiver 808 coupled to the processor 801. Mobile devices typically also include a key pad 806 or miniature keyboard and menu selection buttons or rocker switches 807 for receiving user inputs. In addition to these inputs, the mobile device 800 may be augmented with embodiments for a touchless user interface. The mobile device 800 may use the speaker 804 to emit ultrasound or may incorporate a separate ultrasound emitter, such as an ultrasound transmitter 101. The mobile device may receive the ultrasound, such as from reflections or other mobile devices, through one or more receivers/microphones 102a-102c.

The processor 701, 801 may be any programmable microprocessor, microcomputer or multiple processor chip or chips that can be configured by software instructions (applications) to perform a variety of functions, including the functions of the various embodiments described herein. In some mobile devices, multiple processors 701, 801 may be provided, such as one processor dedicated to wireless communication functions and one processor dedicated to running other applications, such as a separate processor 304. Typically, software applications may be stored in the internal memory 702, 802 before they are accessed and loaded into the processor 801. In some mobile devices, the processor 701, 801 may include internal memory sufficient to store the application software instructions. For the purposes of this description, a general reference to memory refers to all memory accessible by the processor 701, 801, including internal memory 702, 703, 704, 802, removable memory plugged into the device, and memory within the processor 701, 801 itself.

Figure 22:
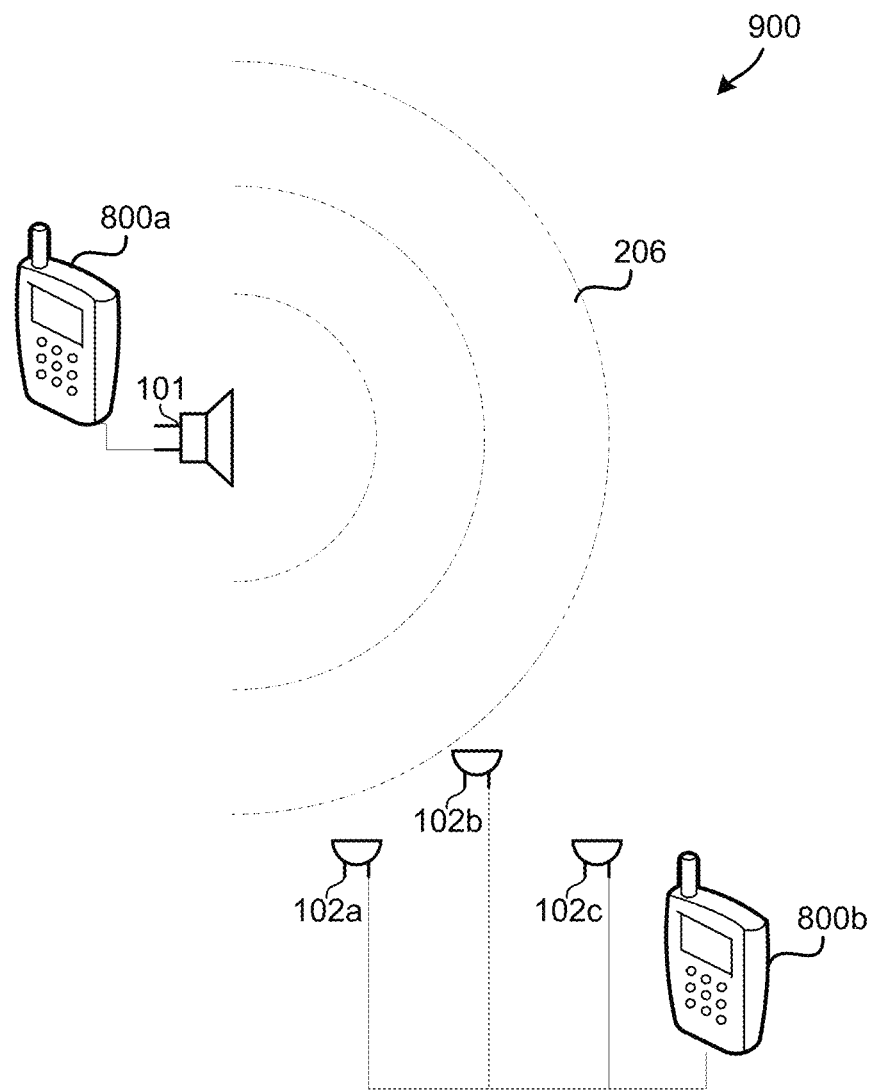
FIG. 22 is an embodiment system of two mobile devices interacting with continuous wave ultrasound.

Further embodiments may involve multiple devices configured with ultrasound emitting and receiving elements working together. As shown in exemplary system 900 illustrated in FIG. 22, two mobile devices 800a, 800b may interact via continuous wave ultrasound. The devices 800a, 800b may be positioned near each other in space. Each device may include its own emitters 101 and receivers 102, but the devices 800a, 800b may be configured so that one device 800a operates in a transmit mode in which the device's emitter 101 is active and emits continuous wave ultrasound 206, while the other device 800b is in a receive mode receiving the continuous wave ultrasound 206 via the device's receivers 102a, 102b, and 102c. By receiving and processing the continuous wave ultrasound 206 according to the various embodiments, the receiving mode device 800b can determine the distance and direction to the emitting device 800a.

Figure 23A:
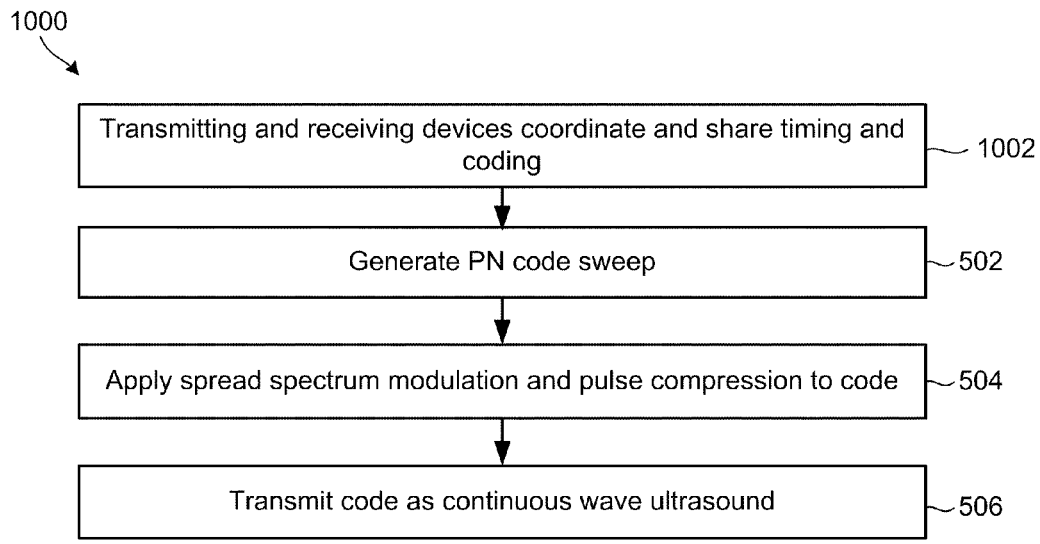
FIG. 23A is a process flow diagram of an embodiment method for determining directions between devices on the transmitting device.

Embodiments further include methods for determining relative coordinates to or distances from the emitter device 800a to the receiver device 800b. An embodiment method 1000 that may be implemented on a mobile device 800a operating in a transmit mode is illustrated in FIG. 23A. In method 1000, the two devices may communicate to coordinate roles and share information on timing and coding in step 1002. This communication may occur over a wireless communication link, such as Bluetooth, WiFi, or any other form of wireless data connection. The devices may coordinate to determine which device will be the transmitting device (i.e., the device that will transmit ultrasound) and which device will be the receiving device (i.e., will receive and process the ultrasound), thereby preventing interference between the devices. The devices may also share data regarding the timing of ultrasound transmission frames that the transmitting device will begin transmitting, as well as and data about the code to be transmitted. Once this coordination has occurred, the transmitting device may generate a pseudorandom noise code sweep, step 502, apply spread spectrum modulation and pulse compression, step 504, and transmit the code as continuous wave ultrasound, step 506, similar to the previously discussed embodiments.

Figure 23B:
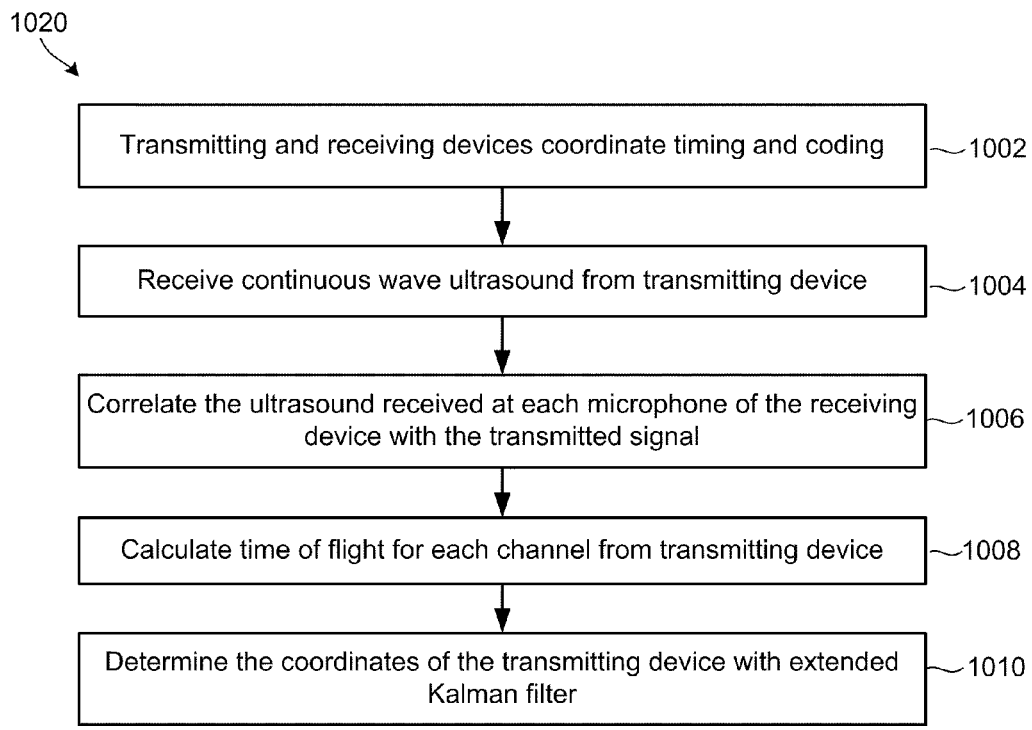
FIG. 23B is a process flow diagram of an embodiment method for determining directions between devices on the receiving device.

An embodiment method 1020 that may be implemented on a mobile device 800b operating in a receive mode is illustrated in FIG. 23B. In method 1020, the devices may coordinate transmission/reception roles, and timing and encoding formats in step 1002 as discussed above. The receiving device may then receive continuous wave ultrasound traveling through the air from the transmitting device in step 1004. To receive the ultrasound transmission, the receiving may need to be within a certain range. In step 1006, the receiving device may correlate the ultrasound signals received at each receiver with the transmitted signal as may be reproduced by the receiver device processor based on timing and code information exchanged in step 1002. The information regarding the timing and code information is necessary because unlike previous embodiments, the receivers 102 and the emitter 101 are not part of the same device tied to the same clock. Using the correlated signals, the receiving device may calculate the time of flight for the transmitted signal to reach each receiver in step 1008, and the time of flight values may be used with a Kalman filter to determine the coordinates in step 1010. The time of flight calculations and Kalman filtering process may be performed in a manner similar to that discussed above with respect to other embodiments, except that the receiving device is determining relative coordinates of the transmitting device instead of a reflecting surface. Once relative coordinates between devices are determined, these coordinates may be mathematically converted into distances or angular directions. For example, the following equation may be used to determine distances between two devices:

$$\sqrt{(x-x_2)^2+(y-y_2)^2}-\sqrt{(x-x_1)^2+(y-y_1)^2}=d_2-d_1 \qquad \text{Eq. 9}$$

In this calculation, the value of d2−d1 can be determined from:

$$d_2-d_1 = \text{sound speed} * \tau_{ML} \qquad \text{Eq. 10}$$

where $\tau_{ML} = \arg\max \int_{-\infty}^{\infty} \psi_{ML}(f) X_1(f) X_2^*(f) e^{j2\pi ft} \, df$
and $X_1(f)$, $X_2(f)$ are the frequency domain signals from the two microphones, and
$\psi_{ML}(f)$ is the weighting factor. For generalized cross correlation (GCC), $\psi_{ML}(f)=1$.

Once coordinates, direction, or distances are determined, such information may be used for many different tasks. For example, a user could select the correct device intended for file sharing based on its relative coordinates or direction with respect to a sending device. A different connection would be used for the file transfer, but the coordinates or directions determined from processing the ultrasound signals could be used to select a destination or source of the file, rather than relying on an address or special name which the user may not know. For example, if the user is in a room with several people using such devices, the user could differentiate between the different devices just by looking around. The user could send a file to a friend standing to the left by selecting via a device graphical user interface a device with the coordinates or directions that match up with the intended recipient, thereby avoiding accidentally sending the file to a stranger. As another example, a user may want to transfer a song from an audio player to a stereo. If the stereo is in a room full of other appliances with similar touchless interfaces, the user could rely on relative coordinates or direction determined from such ultrasound tracking systems to pick the stereo rather than the microwave or the dishwasher.

The exemplary methods in FIGS. 22A and 22B illustrate just one of the ways in which two of more devices may interact using the various embodiments. As another example, the devices may be used in a manner similar to that discussed in the previous embodiments, with a device taking the place of a user's hand. A receiving device may track movement of the transmitting device or extract features or patterns of the transmitting device's movement that may be correlated with various commands or other communications.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored on or transmitted over as one or more instructions or code on a computer-readable medium. The steps of a method or algorithm disclosed herein may be embodied in a processor-executable software module executed which may reside on a tangible non-transitory computer-readable medium or processor-readable medium. Non-transitory computer-readable and processor-readable media may be any available media that may be accessed by a computer or processor. By way of example, and not limitation, such non-transitory computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed aspects is provided to enable any person skilled in the art to make or use the present invention. Various modifications to these aspects will be readily apparent to those skilled in the art, and the generic principles defined herein may be applied to other aspects without departing from the scope of the invention. Thus, the present invention is not intended to be limited to the aspects shown herein but is to be accorded the widest scope consistent with the principles and novel features disclosed herein.

What is claimed is:

1. A method for recognizing a user input gesture, the method comprising:
receiving, at a sound detector, ultrasound signals that are encoded with temporal information, wherein the ultrasound signals are frequency modulated with a pseudo-random noise signal;
calculating a channel impulse response based on the ultrasound signals;
processing the channel impulse response to extract at least one feature;
comparing the extracted at least one feature to a database of channel impulse response features to identify a particular matched feature; and
selecting a command to be executed by a processor based on the particular matched feature.

2. The method of claim 1, further comprising initiating transmission of the ultrasound signals from an ultrasound emitter.

3. The method of claim 1, wherein the ultrasound signals are temporally encoded with a changing frequency.

4. The method of claim 1, wherein the ultrasound signals are temporally encoded using a spread spectrum modulation.

5. The method of claim 1, wherein receiving the ultrasound signals at the sound detector comprises receiving the ultrasound signals at three sound detectors.

6. The method of claim 1, wherein processing the channel impulse response to extract the at least one feature comprises subtracting a background channel impulse response from the channel impulse response to obtain a reflector channel impulse response.

7. The method of claim 6, wherein processing the channel impulse response to extract the at least one feature further comprises determining a sequence of difference channel impulse responses and processing the sequence of difference channel impulse responses as a sequence of images.

8. The method of claim 7, wherein processing the channel impulse response to extract the at least one feature further comprises applying an edge filter to the sequence of images.

9. The method of claim 7, wherein processing the channel impulse response to extract the at least one feature further comprises applying a grey scale correlation matrix to the sequence of images.

10. The method of claim 7, wherein comparing the extracted at least one feature to the database of the channel impulse response features comprises performing an analysis using a method that includes a k-nearest neighbors analysis, an artificial neural nets analysis, a hidden Markov models analysis, or a combination thereof.

11. The method of claim 1, further comprising:
identifying a strongest reflector based on the extracted at least one feature;
measuring a time of flight of the ultrasound signals from the identified strongest reflector; and
determining a location in space of the identified strongest reflector based on the measured time of flight of the ultrasound signals, wherein selecting the particular matched feature is further based on the location in space of the identified strongest reflector.

12. The method of claim 11, further comprising applying Kalman filtering to the measured time of flight of the ultrasound signals.

13. The method of claim 1, further comprising determining a channel impulse response curve based on the channel impulse response, wherein processing the channel impulse response to extract the at least one feature comprises determining a reflector movement direction based upon angle information derived from the channel impulse response curve, and wherein selecting the particular matched feature is further based on the reflector movement direction.

14. A computer system comprising:
a processor;
a memory coupled to the processor;
an ultrasound emitter coupled to the processor; and one or more sound detectors coupled to the processor,
wherein the processor is configured with processor-executable instructions to perform operations comprising:
receiving, at a sound detector of the one or more sound detectors, ultrasound signals that are encoded with temporal information, wherein the ultrasound signals are frequency modulated with a pseudorandom noise signal;
calculating a channel impulse response based on the ultrasound signals;
processing the channel impulse response to extract at least one feature;
comparing the extracted at least one feature to a database of channel impulse response features to identify a particular matched feature; and
selecting a command to be executed by the processor based on the particular matched feature.

15. The computer system of claim 14, wherein the operations further comprise initiating transmission of the ultrasound signals from the ultrasound emitter.

16. The computer system of claim 14, wherein the ultrasound signals are temporally encoded with a changing frequency.

17. The computer system of claim 14, wherein the ultrasound signals are temporally encoded using a spread spectrum modulation.

18. The computer system of claim 14, wherein receiving the ultrasound signals at the sound detector comprises receiving the ultrasound signals at three sound detectors of the one or more sound detectors.

19. The computer system of claim 14, wherein processing the channel impulse response to extract the at least one feature comprises subtracting a background channel impulse response from the channel impulse response to obtain a reflector channel impulse response.

20. The computer system of claim 19, wherein processing the channel impulse response to extract the at least one feature further comprises determining a sequence of difference channel impulse responses and processing the sequence of difference channel impulse responses as a sequence of images.

21. The computer system of claim 20, wherein processing the channel impulse response to extract the at least one feature further comprises applying an edge filter to the sequence of images.

22. The computer system of claim 20, wherein processing the channel impulse response to extract the at least one feature further comprises applying a grey scale correlation matrix to the sequence of images.

23. The computer system of claim 20, wherein comparing the extracted at least one feature to the database of the channel impulse response features comprises performing an analysis using a method that includes a k-nearest neighbors analysis, an artificial neural nets analysis, a hidden Markov models analysis, or a combination thereof.

24. The computer system of claim 14, wherein the operations further comprise:
identifying a strongest reflector based on the extracted at least one feature;
measuring a time of flight of the ultrasound signals from the identified strongest reflector; and
determining a location in space of the identified strongest reflector based on the measured time of flight of the ultrasound signals.

25. The computer system of claim 24, wherein the operations further comprise applying Kalman filtering to the measured time of flight of the ultrasound signals.

26. The computer system of claim 14, wherein the operations further comprise determining a channel impulse response curve based on the channel impulse response, and wherein processing the channel impulse response to extract the at least one feature comprises determining a reflector movement direction based on angle information derived from the channel impulse response curve.

27. A computer system comprising:
means for receiving, at a sound detector, ultrasound signals that are encoded with temporal information, wherein the ultrasound signals are frequency modulated with a pseudorandom noise signal;
means for calculating a channel impulse response based on the ultrasound signals;
means for processing the channel impulse response to extract at least one feature;
means for comparing the extracted at least one feature to a database of channel impulse response features to identify a particular matched feature; and
means for selecting a command to be executed by a processor based on the particular matched feature.

28. The computer system of claim 27, further comprising means for initiating transmission of the ultrasound signals from an ultrasound emitter.

29. The computer system of claim 27, wherein the ultrasound signals are temporally encoded with a changing frequency.

30. The computer system of claim 27, wherein the ultrasound signals are temporally encoded using a spread spectrum modulation.

31. The computer system of claim 27, wherein the means for receiving the ultrasound signals comprises means for receiving the ultrasound signals at three sound detectors on a computing device.

32. The computer system of claim 27, wherein the means for processing the channel impulse response to extract the at least one feature comprises means for subtracting a background channel impulse response from the channel impulse response to obtain a reflector channel impulse response.

33. The computer system of claim 32, wherein the means for processing the channel impulse response to extract the at least one feature further comprises means for determining a sequence of difference channel impulse responses and processing the sequence of difference channel impulse responses as a sequence of images.

34. The computer system of claim 33, wherein the means for processing the channel impulse response to extract the at least one feature further comprises means for applying an edge filter to the sequence of images.

35. The computer system of claim 33, wherein the means for processing the channel impulse response to extract the at least one feature further comprises means for applying a grey scale correlation matrix to the sequence of images.

36. The computer system of claim 33, wherein the means for comparing the extracted at least one feature to the database of the channel impulse response features comprises means for performing an analysis using a method that includes a k-nearest neighbors analysis, an artificial neural nets analysis, a hidden Markov models analysis, or a combination thereof.

37. The computer system of claim 27, further comprising:
means for identifying a strongest reflector based on the extracted at least one feature;
means for measuring a time of flight of the ultrasound signals from the identified strongest reflector; and means for determining a location in space of the identified strongest reflector based on the measured time of flight of the ultrasound signals.

38. The computer system of claim 37, further comprising means for applying Kalman filtering to the measured time of flight of the ultrasound signals.

39. The computer system of claim 27, further comprising means for determining a channel impulse response curve based on the channel impulse response, wherein the means for processing the channel impulse response to extract the at least one feature comprises means for determining a reflector movement direction based on angle information derived from the channel impulse response curve.

40. A non-transitory computer readable storage medium storing computer-executable instructions that, when executed by a computer, cause the computer to perform operations comprising:
receiving, at a sound detector, ultrasound signals that are encoded with temporal information, wherein the ultrasound signals are frequency modulated with a pseudorandom noise signal;
calculating a channel impulse response based on the ultrasound signals;
processing the channel impulse response to extract at least one feature;
comparing the extracted at least one feature to a database of channel impulse response features to identify a particular matched feature; and
selecting a command to be executed by a processor based on the particular matched feature.

41. The non-transitory computer readable storage medium of claim 40, wherein the operations further comprise initiating transmission of the ultrasound signals from an ultrasound emitter.

42. The non-transitory computer readable storage medium of claim 40, wherein the ultrasound signals are temporally encoded with a changing frequency.

43. The non-transitory computer readable storage medium of claim 40, wherein the ultrasound signals are temporally encoded using a spread spectrum modulation.

44. The non-transitory computer readable storage medium of claim 40, wherein receiving the ultrasound signals at the sound detector comprises receiving the ultrasound signals at three sound detectors on a computing device.

45. The non-transitory computer readable storage medium of claim 40, wherein processing the channel impulse response to extract the at least one feature comprises subtracting a background channel impulse response from the channel impulse response to obtain a reflector channel impulse response.

46. The non-transitory computer readable storage medium of claim 45, wherein processing the channel impulse response to extract the at least one feature further comprises determining a sequence of difference channel impulse responses and processing the sequence of difference channel impulse responses as a sequence of images.

47. The non-transitory computer readable storage medium of claim 46, wherein processing the channel impulse response to extract the at least one feature further comprises applying an edge filter to the sequence of images.

48. The non-transitory computer readable storage medium of claim 46, wherein processing the channel impulse response to extract the at least one feature further comprises applying a grey scale correlation matrix to the sequence of images.

49. The non-transitory computer readable storage medium of claim 46, wherein comparing the extracted at least one feature to the database of the channel impulse response features comprises performing an analysis using a method that includes a k-nearest neighbors analysis, an artificial neural nets analysis, a hidden Markov models analysis, or a combination thereof.

50. The non-transitory computer readable storage medium of claim 40, wherein the operations further comprise:
identifying a strongest reflector based on the extracted at least one feature;
measuring a time of flight of the ultrasound signals from the identified strongest reflector; and
determining a location in space of the identified strongest reflector based on the measured time of flight of the ultrasound signals, wherein selecting the particular matched feature is further based on the location in space of the identified strongest reflector.

51. The non-transitory computer readable storage medium of claim 50, wherein the operations further comprise applying Kalman filtering to the measured time of flight of the ultrasound signals.

52. The non-transitory computer readable storage medium of claim 40, wherein the operations further comprise determining a channel impulse response curve based on the channel impulse response, wherein processing the channel impulse response to extract the at least one feature comprises determining a reflector movement direction based on angle information derived from the channel impulse response curve, and wherein selecting the particular matched feature is further based on the reflector movement direction.

53. The method of claim 1, further comprising selecting the particular matched feature from a plurality of matched features identified from the database of channel impulse response features based on at least one of an operating state of the processor and a previous command executed by the processor.

54. The method of claim 53, wherein the particular matched feature is selected based on the operating state, wherein the operating state indicates one or more applications that are being executed by the processor, and wherein the particular matched feature corresponds to a feature of a gesture associated with a command executable by at least one of the one or more applications.

55. The method of claim 53, wherein the particular matched feature is selected based on the previous command, and wherein the particular matched feature corresponds to a feature of a gesture associated with a command that is executable by the processor after the previous command is executed.

56. The method of claim 13, further comprising determining an angle of the channel impulse response curve based on a summation of an amplitude of the channel impulse response curve for a sample frame index and an impulse tap index associated with a particular filter size.

57. The method of claim 1, further comprising:
receiving the ultrasound signals at a plurality of sound detectors, wherein each sound detector of the plurality of sound detectors is associated with a separate communication channel; and
calculating a corresponding channel impulse response for each communication channel.

58. The method of claim 1, wherein the at least one feature is extracted from the channel impulse response without demodulating the ultrasound signals.

* * * * *